(12) United States Patent
Morris

(10) Patent No.: US 11,593,852 B2
(45) Date of Patent: *Feb. 28, 2023

(54) SYSTEM AND METHOD FOR SWAPPING EVENT TICKETS

(71) Applicant: SLIDEBI LLC, Stamford, CT (US)

(72) Inventor: Jarrett Morris, Stamford, CT (US)

(73) Assignee: SLIDEBI LLC, Stamford, CT (US)

( * ) Notice: Subject to any disclaimer, the term of this patent is extended or adjusted under 35 U.S.C. 154(b) by 156 days.

This patent is subject to a terminal disclaimer.

(21) Appl. No.: 17/188,099

(22) Filed: Mar. 1, 2021

(65) Prior Publication Data

US 2021/0182929 A1   Jun. 17, 2021

Related U.S. Application Data

(63) Continuation of application No. 15/659,154, filed on Jul. 25, 2017, now Pat. No. 10,963,933.

(60) Provisional application No. 62/501,898, filed on May 5, 2017, provisional application No. 62/366,386, filed on Jul. 25, 2016.

(51) Int. Cl.
*G06Q 30/06*      (2012.01)
*G06Q 50/18*      (2012.01)
*G06Q 30/0601*    (2023.01)

(52) U.S. Cl.
CPC ..... *G06Q 30/0611* (2013.01); *G06Q 30/0609* (2013.01); *G06Q 50/188* (2013.01)

(58) Field of Classification Search
CPC .......... G07B 5/00; G06Q 30/00; G06Q 50/00; G06Q 90/00; G06Q 30/0609; G06Q 30/0611
See application file for complete search history.

(56) References Cited

U.S. PATENT DOCUMENTS

| 8,175,926 B1 | 5/2012 | Handel et al. |
| 8,185,524 B2 | 5/2012 | Weber et al. |
| 8,484,088 B1 | 7/2013 | Orttung et al. |
| 8,555,367 B2 | 10/2013 | Syed et al. |
| 8,731,526 B2 | 5/2014 | Gibson |
| 9,088,560 B1 | 7/2015 | Newstad |

(Continued)

OTHER PUBLICATIONS

Stone, Brad "Don't Like Your Seat? Baseball Fans Can Now Upgrade, Mid-Game" Bloomberg Mar. 13, 2013; available at: https://www.bloomberg.com/news/articles/2013-03-13/dont-like-your-seat-baseball-fans-can-now-upgrade-mid-game (Year: 2013).*

(Continued)

*Primary Examiner* — Andrew B Whitaker
*Assistant Examiner* — Brendan S O'Shea
(74) *Attorney, Agent, or Firm* — Dilworth IP, LLC

(57) ABSTRACT

A system and method for exchanging or selling event tickets, including a database, a computing device, a seller's mobile device and a buyer's mobile device, a network connecting the computing device and the mobile devices, a plurality of modules executing on the computing device including an authentication module, a geolocation information, and a tickets information module, wherein the geolocation information module tracks the geolocations of the one or more users' mobile devices and verifies that the geolocations of the seller's mobile device and the buyer's mobile device are within a same venue as a prerequisite to the confirmation platform module facilitating an exchange of tickets.

20 Claims, 26 Drawing Sheets

(56) References Cited

U.S. PATENT DOCUMENTS

| | | |
|---|---|---|
| 9,489,680 B2 | 11/2016 | Baker et al. |
| 2011/0087887 A1 | 4/2011 | Luft et al. |
| 2011/0166950 A1 | 7/2011 | Goldstein et al. |
| 2011/0178891 A1 | 7/2011 | Charriere |
| 2012/0302256 A1 | 11/2012 | Pai et al. |
| 2013/0096961 A1 | 4/2013 | Owens et al. |
| 2015/0051928 A1 | 2/2015 | Gibson et al. |
| 2016/0094943 A1 | 3/2016 | Cao |
| 2016/0232515 A1 | 8/2016 | Jhas et al. |
| 2016/0253749 A1 | 9/2016 | Gray |
| 2016/0335565 A1 | 11/2016 | Charriere et al. |
| 2017/0316478 A1 | 11/2017 | Hammond |
| 2018/0018596 A1 | 1/2018 | Siegel |
| 2018/0018597 A1 | 1/2018 | Siegel |
| 2018/0018598 A1 | 1/2018 | Siegel |

OTHER PUBLICATIONS

Leimkuehler, Matthew "Tips for buying tickets safely on second-hand market" Des Moines Register, Sep. 30, 2015; available at: https://www.desmoinesregister.com/story/entertainment/music/2015/09/30/tips-buying-tickets-safely-secondhand-market/73089700/ (Year: 2015).

* cited by examiner

Madison Square Garden

↓Price  # of tickets  Recently added

TOR Raptors @ NY Knicks
Main level
101 Section ● Box ● Row 2 Together | $50 Total TOR Raptors @ NY Knicks
Main level
43 Section ● Box ● Row 2 Together | $50 Total TOR Raptors @ NY Knicks
Main level
43 Section ● Box ● Row 2 Together | $35 Total TOR Raptors @ NY Knicks
Main level
43 Section ● Box ● Row 2 Together | $50 & Exchange

FIG. 12

| | | |
|---|---|---|
| Cancel | Post tickets | Next |
| Event name | TOR Raptors@ NY Knicks | |
| Event date | 12-21-2016 | > |
| Quantity of tickets | ● 2 ⊕ | |
| Tickets together | ◯ | |
| Exchange | ◯ | |
| Level | Main | |
| Section | 43 | Row J |
| Seats | 1-2 | Box 3 |
| Price | $50 | |
| ∧ ∨ | | Done |

| 1 | 2 ABC | 3 DEF |
|---|---|---|
| 4 GHI | 5 JKL | 6 MNO |
| 7 PQRS | 8 TUV | 9 WXYZ |
| +*# | 0 | ⌫ |

FIG. 13

SYSTEM AND METHOD FOR SWAPPING EVENT TICKETS

FIELD OF THE INVENTION

The technology relates to the field of applications for mobile devices. More specifically, the technology provides an application for exchanging tickets for events among users.

BACKGROUND

Several systems exist for selling or exchanging tickets for events. Historically, the most common way tickets were exchanged was by purchasing the ticket from the event venue. Sometimes, tickets were also available from external sources, such as a Ticketmaster location. With advancing technology, ticket exchanges have become more efficient and convenient.

With the advent of the internet and widespread electronic communication, many event venues and ticket providers made tickets available for purchase online. In some instances, the tickets were sent to the purchasers. In others, the purchaser picked the tickets up upon arrival at the venue. In addition, third-party aftermarket ticket services, such as StubHub, are also commonly used today. These services allow users to buy and sell tickets amongst themselves, creating an aftermarket whereby interested parties can find tickets to events that may already be sold out.

Direct event-goer interaction and sales has improved ticket availability, and online exchange systems have made ticket search and purchase processes more efficient. However, there remains a need in the art for a convenient manner of managing and exchanging tickets after purchase, up to and including during the event itself. Systems have been created to assist with the management of a user's ticket portfolio, such as the technology disclosed in U.S. Pat. No. 8,175,926. The '926 patent's technology helps the owner of a variety of tickets to organize and manage how they are used and distributed. The technology is primarily directed to an organizational user, who may have purchased a large quantity of tickets to benefit from bulk purchase pricing and wishes to ensure the least amount of waste resulting from unused tickets. While the '926 patent's technology is useful in managing an organization's ticket portfolio, so to speak, among its employees, there remains a need in the art for a user exchange system that allows separate and unrelated users to contact one another and exchange tickets during the event.

SUMMARY

Accordingly, it is an object of the present technology to provide a system and process for connecting users wishing to exchange tickets immediately and in real-time. The present technology provides an interactive application through which event-goers can contact one another and exchange tickets, preferably at the event venue itself.

For example, an event-goer may have already purchased tickets for an event when an emergency arises immediately before the event begins. The event-goer may locate a nearby user seeking tickets to that event, contact that user using the present technology, negotiate a price for exchange of the tickets, and schedule a time and place to make the exchange. In some embodiments, the present technology may include location technology that allows the users seeking the exchange to locate one another. In some embodiments, the application may also create an identification code that can be displayed through the application to assist the users in locating one another at a particular location.

The invention is also useful when a user has been enjoying the event for a short time but needs to leave due to an emergency or just simply chooses to leave early. Rather than waste the tickets by leaving the seats empty, the user may seek to exchange the ticket with another user at the event who would like to improve his or her seat location. The technology is also particularly useful for users who intend on remaining at the event but simply wish to exchange seats. In each instance, the present technology permits the users to contact one another and negotiate terms on an exchange, as well as assisting the users in finding one another once an agreement has been reached.

To accomplish its objectives, the present technology employs a system and method for connecting users and facilitating exchanging tickets to events. The users sign up for the service on their mobile devices using user authentication information. In some embodiments, the authentication information may include the user's mobile phone number, a pin, a username, and/or a password. In some embodiments, the user is authenticated via SMS, unique pin, etc. Users can also sign up via their Facebook Login. Once the user signs up, he or she enters the authentication information to access the system. In preferable embodiments, the system is granted access to the mobile device's location (using GPS technology or otherwise) and the mobile device's push notification system.

In some embodiments, upon opening the mobile application, the user is presented with the application home screen, which provides a listing of available tickets. If the application has been granted access to the mobile device's location through location services, the tickets listed on the home screen may be limited to those available from other users confirmed to be within a defined radius (e.g., 0.25 miles) of the user's mobile device (e.g., in the venue). The user may also use a search function to find tickets based on a particular event, date, event type, etc. In preferred embodiments, the system confirms that the user is within the venue such as by GPS or other location means discussed herein. If the user is interested in purchasing any of the tickets listed, he or she may select a ticket in the listing to access a details page, which may include further information about the event, the user offering the ticket for sale ("Seller"), the price sought, and other applicable information. In some embodiments, the Seller may be referred to as a flipper. Some or all of this information may also be provided in the list of tickets on the home page or based on the search, in some embodiments.

If the user decides he or she would like to purchase the selected ticket, the application provides a negotiation platform. The Seller's asking price is listed and begins the negotiations. The user seeking to purchase the ticket ("Buyer") may place an offer for the ticket through the application's negotiation platform. In some embodiments, the Seller may be referred to as a getter. Upon submitting an offer, the Buyer's mobile device may display an "awaiting response" or other similar message while the Seller considers the Buyer's offer. In certain embodiments, the Buyer may also have the opportunity to cancel the offer prior to the Seller's response.

When the Buyer submits the offer, the Seller of the ticket is notified. If the application has been granted access to the Seller's mobile device's push notification system, the notification may be provided through a push notification. Other notification techniques, such as a text message or email, are also available. Upon receiving notification of the offer, the Seller may access the application to review the terms of the offer. The Seller may choose to reject the offer, make a counter-offer, or open a negotiation chat window through which the interested Buyer and Seller may negotiate further and finalize terms. The application allows the Seller to simultaneously consider offers from multiple users for the same ticket. If an agreement is reached, the Seller can confirm the deal has been finalized to remove the sold ticket from consideration by other interested users.

Upon completion of the sale, the application preferably will assist the Buyer and Seller in locating one another (e.g., in the venue). Location assistance can employ GPS technology and/or indoor positioning systems, such as Apple's iBeacon, Google's Eddystone, and the like. Location(s) may also be determined and/or confirmed by each of the Buyer and Seller being connected to the same Wi-Fi network, such as a Wi-Fi network associated with the venue. Further, the application preferably will provide a unique identification code that both the Buyer and Seller can display on their mobile devices, thereby allowing them to identify one another in crowded event locations. Upon meeting face to face, the Buyer and Seller can exchange the tickets and payment, if payment has not already been made electronically through the mobile application.

In some embodiments, a system for exchanging event tickets is provided, including a database, a computing device, one or more mobile devices, including a seller's mobile device and a buyer's mobile device, a network connecting the computing device and the one or more users' mobile devices, a plurality of modules including authentication module, a geolocation information module for tracking geolocations of the one or more users' mobile devices, a tickets information module, a notifications module, a negotiations platform module, and a confirmation platform module for facilitating an exchange of tickets, wherein the geolocation information module tracks the geolocations of the one or more users' mobile devices and verifies that the geolocations of the seller's mobile device and the buyer's mobile device are within a same venue as a prerequisite to the confirmation platform module facilitating an exchange of tickets.

Those skilled in the art will appreciate the many alterations and additions available to the described application. The present technology is not limited to the embodiments and arrangements described above. Other objects of the present technology and its particular features and advantages will become more apparent from consideration of the following drawings and detailed description of the technology.

BRIEF DESCRIPTION OF THE DRAWINGS

FIG. 12 is a depiction of an available-ticket-list screen employed by exemplary embodiments of the system of FIG. 1 according to exemplary embodiments of the present technology.

FIG. 13 is a depiction of a post-tickets screen employed by exemplary embodiments of the system of FIG. 1 according to exemplary embodiments of the present technology.

DETAILED DESCRIPTION OF THE INVENTION

Figure 1:
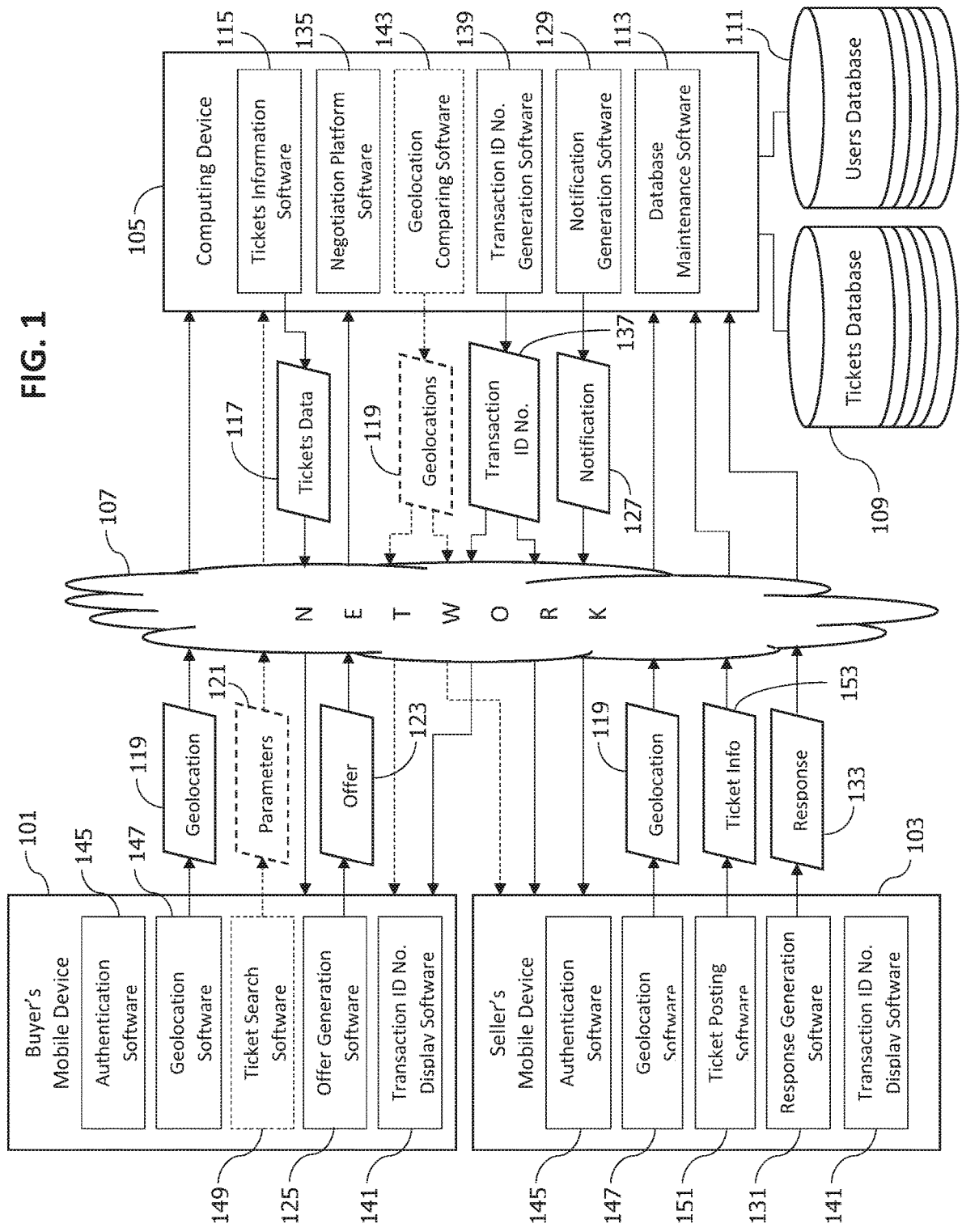
FIG. 1 is a schematic representation of a system according to exemplary embodiments of the present technology.

The following detailed description illustrates the technology by way of example, not by way of limitation of the principles of the invention. This description will enable one skilled in the art to make and use the technology, and describes several embodiments, adaptations, variations, alternatives and uses of the invention, including what is presently believed to be the best mode of carrying out the invention. One skilled in the art will recognize alternative variations and arrangements, and the present technology is not limited to those embodiments described hereafter.

The present technology provides an interactive system for exchanging tickets among event-goers, facilitating negotiation with and location of other users in real-time immediately prior to and even during the event. The system is preferably embodied in an application for mobile devices. In some embodiments, the system is comprised of software code such as code programmed in Objective-C and/or Swift 2.

Upon initially downloading the application, the new user will be introduced to the system and given the opportunity to create login authentication information. Authentication information preferably includes the user's mobile telephone number, but may also or alternatively include a username, password, unique pin, and the like in some embodiments. The system stores the user's authentication information in a user's database in communication with the application. In some embodiments, the user's database may be directly connected or instead connected with the system over a network. Those skilled in the art will recognize the various available arrangements.

The application will preferably also request access to the mobile device's location services and push notification services. Upon opening the mobile application, the user is presented with the homepage. In some embodiments, the home page includes a list of tickets available for purchase. In some embodiments, the list is generated based on the user's geolocation, ticket search history, or other individualized criteria. Those tickets sold by other users closest to the user are preferably listed at the top, and the list may be limited to users selling tickets within a certain radial distance from the user. In some embodiments, the user may also enter search parameters seeking tickets to specific events, event types, dates, seat locations, etc. In such embodiments, the system can update the list of available tickets based on the user's search parameters. The search function is especially useful if the user has declined to allow the application access to the mobile device's location services.

The system generates the ticket list by accessing a tickets database, wherein all the tickets other users have posted for sale are maintained. Like the users database, the tickets database may be directly connected or instead connected with the system over a network in some embodiments. Those skilled in the art will recognize the various available arrangements. In some embodiments, the home page may also provide the user access to a settings menu, a notification display, a user contact option, and/or a ticket posting option. These examples are intended to be exemplary and are not intended to limit the present technology, which may include additional features and arrangements within the ordinary knowledge and creativity of those skilled in the art.

In preferable embodiments, the user may select one of the available tickets from the list to open a tickets details screen, through which the user can review details about the ticket selected. Such information can include event name, date, and location, number of tickets/seats available from the Seller, how many of the seats are together, location of the seats, including ticket level, section, seat numbers, etc. In some embodiments, the Seller may also include a photograph of himself with the tickets, preferably from the seats at the event. The photograph will help the Buyer identify the Seller assuming a deal is reached and may show the Buyer exactly where the seats are, for example how close to the stage, field, etc. Further, the presence of the Seller in the event venue will help to avoid fraud. The Seller's presence in the event venue may be verified using the Seller's mobile device's geolocation, using geotags from the metadata of the photograph taken, or otherwise. Some or all of this information about the tickets may also be presented in the available tickets list, in some embodiments.

The tickets detail screen may also include the Seller's initial asking price for the tickets. If the Buyer is interested, he or she may submit an offer matching the Seller's asking price or offering a different price. Once an offer is made, the system will send a notification to the Seller of the pending offer. Notifications are preferably sent through push notifications, but may also be delivered by text message, email, social media platforms, or other comparable notification techniques, as will be recognized by those skilled in the art. In some embodiments, upon submitting an offer, the Buyer will be presented with a display indicating that the offer is awaiting the Seller's response. In some embodiments, the Buyer will have the ability to withdraw his or her offer prior to the Seller's response. The Buyer may also have the option to continue to search and review other available tickets during this waiting period, in some embodiments.

The Seller receiving the notification may open his or her mobile application and review the offer. Preferably, the Seller has the opportunity to accept, decline, counteroffer, or open a negotiation platform that will connect the Buyer and Seller for further discussions. If the Seller declines the Buyer's offer, the system may send the Buyer a notification of the Seller's refusal, in some embodiments. Declining the Buyer's offer will also remove that offer from the offers queue associated with that ticket, preferably maintained in the tickets database. If the Seller counters the Buyer's offer, the Buyer will then have the opportunity to accept or decline the Seller's counteroffer. In some embodiments, the application provides the recipient of an offer the opportunity to open a negotiation platform, whereby the Buyer and Seller may communicate to reach an agreement. In some embodiments, the Seller may negotiate with multiple potential Buyers simultaneously, and even in the same communication window in some embodiments, such that the various potential Buyers can see what the other Buyers are offering and act accordingly. Any party may terminate negotiations at any time, which would act to withdraw any outstanding offers from consideration.

If the Seller accepts a Buyer's offer, the application preferably opens a communication platform that allows the Buyer and Seller to discuss details of the exchange, such as where and when to meet. In some embodiments, payment may be made electronically or in person at the time of the ticket exchange. In some embodiments, electronic payment may only occur when the Buyer and Seller are close by, for example when their mobile devices are within Bluetooth connection or Near-field communication (NFC) range.

Some embodiments also generate digital tickets usable to replace the physical tickets being exchanged.

In addition, when an agreement is reached, preferable embodiments of the application will facilitate bringing the Buyer and Seller together to meet. In some embodiments, the application may use the geolocations of the Buyer's and Seller's mobile devices to bring the parties together in the venue. For example, the application might display a map depicting each's location or a real-time tracking of the distance between the two devices, in some embodiments. The system may utilize GPS technology and/or indoor positioning systems, such as Apple's iBeacon, Google's Eddystone, and the like, in such embodiments. Location(s) may also be determined and/or confirmed by each of the Buyer and Seller being connected to the same Wi-Fi network, such as a Wi-Fi network associated with the venue, by geotagging the exchanging parties' photographs of the tickets and/or seats, or other known means. The application also preferably displays a unique transaction identification number, or a randomly generated code, on both the Buyer's and Seller's mobile devices. This ID number will help the Buyer and Seller identify one another in crowded environments, and confirm their identities.

Once the transaction has been completed, the Seller will preferably confirm the exchange on the application. By confirming the exchange, the system can update the tickets database to remove the exchanged tickets, thereby avoiding any additional offers from other users. During negotiation for available tickets, the Seller may be in communication with multiple Buyers making multiple offers in some embodiments. Such offers may be listed in the offers queue associated with the Seller's tickets. In such embodiments, upon completion of an exchange, the system may notify the other potential Buyers that the tickets have been sold.

A user seeking to post tickets for sale may do so by accessing a ticket posting option, preferably from the home screen. If the user has not logged in, the application will request that he or she do so prior to accessing the ticket posting option. To post a ticket, the Seller enters information about the tickets, preferably including the event name, date, and location, number of tickets/seats available from the Seller, how many of the seats are together, location of the seats, including ticket level, section, seat numbers, etc. In some embodiments, the system confirms the Sellers position and that the Seller is located in the venue before listing. In some embodiments, the Seller may also include a photograph of himself with the tickets, preferably from the seats at the event. The photograph will help the Buyer identify the Seller assuming a deal is reached and may show the Buyer exactly where the seats are, for example how close to the stage, field, etc. Metadata from the photograph, including a geotag, may be used by the system to confirm the Seller's presence inside the venue. In preferable embodiments, the Seller also provides an initial asking price for the tickets, which can be used as a starting point for negotiations with potential Buyers.

In some embodiments, the system may provide Sellers with a display listing all tickets that Seller has listed as available. Such display will assist the Seller in tracking the tickets he or she is seeking to exchange. In preferable embodiments, the Seller may select a ticket from the list to open the offers queue for that ticket. The offer queue preferably displays the current offers submitted by other Buyers for the particular ticket or tickets selected. Selecting an offer from the offers queue preferably allows the Seller to review the offer and accept, decline, counter, or negotiate with the Buyer who made the offer.

Users can also access the user settings menu, which is preferably maintained through the system's users database. Through the user settings menu, users can update their user profiles, including identifying information, photograph, and preferred payment system. In some embodiments, the user settings menu can access further information, such as the user's history of exchanging tickets, current and past tickets the user posted, offered, and/or exchanged, and other applicable information. Those skilled in the art will recognize available alterations to the features and arrangements presented, which are not intended to limit the scope of the present technology.

Referring now to FIG. 1, a schematic representation of a system according to exemplary embodiments of the present technology is depicted. As shown, the Buyer's mobile device 101 and Seller's mobile device 103 are in electronic communication with the system's computing device 105, preferably over a network 107 such as the internet. The computing device 105 is also in electronic communication with a tickets database 109 and a users database 111. As previously noted, the databases may be directly connected to the computing device 105, connected over a network 107, or otherwise connected. The users database 111 stores information about the authenticated users of the system while the tickets database 109 stores information about the tickets posted for sale. The computing device 105 maintains and updates the databases using database maintenance software 113, for example, when new users join or new tickets are posted for sale.

In preferable embodiments, the computing device 105 employs tickets information software 115 for generating data about available tickets from the tickets database 109 and sending that data to the users. In some embodiments, the tickets data 117 is generated on the basis of the user's geolocation 119 (e.g., in a particular venue). In some embodiments, the tickets data may be generated and/or updated based on search parameters 121 received from the user's mobile device. In preferable embodiments, the tickets data 117 is presented to the user's mobile device in the form of a list of available tickets sorted based on geolocation 119 or search parameters 121, as the case may be. In some embodiments, the list of available tickets is presented to the user on the application's home page.

A user seeking tickets may select a ticket from the list, review its details, and submit an offer if he or she is interested. The Buyer's mobile device 101 generates the offer 123 using offer generation software 125 and sends it to the computing device 105, preferably over the network 107. Upon receipt of an offer 123, the computing device 105 generates and sends a notification 127 to the Seller of the ticket(s) using notification generation software 129. Preferably, the notification 127 is sent via a push notification. However, other forms of notification, including text message, email, social media platforms, and the like, are available and well-known by those skilled in the art.

Upon receipt of the notification 127, the Seller can access the application on his or her mobile device 103 to review the terms offered. In preferable embodiments, the offer 123 is added to an offers queue that lists all the offers available for the associated ticket(s). The Seller can then select the offer 123 and choose to decline, accept, counter, or negotiate with the Buyer. Response generation software 131 on the Seller's mobile device sends the Seller's response 133 to the computing device 105 through the network 107. The computing device 105 takes appropriate action depending upon the Seller's response 133. For example, if the Seller declines the offer 123, preferable embodiments of the system will send the Buyer a notification 127 that the Seller has declined the offer 123. If the Seller has countered, preferable embodiments of the system will send the Buyer a notification 127 of the Seller's counteroffer. If the Seller (or Buyer in response to a counteroffer) wishes to open a negotiation discussion, the computing device 105 can generate a negotiation platform using negotiation platform software 135 to facilitate further discussions between the Buyer and Seller. Any party may terminate negotiations at any time, which would act to withdraw any outstanding offers from consideration.

When an agreement is reached, the Seller notifies the computing device 105 of acceptance of an offer 123, and the computing device 105 updates the tickets database 109 to remove the exchanged tickets from the available tickets queue, in preferable embodiments. The computing device 105 also preferably generates and sends to both Buyer and Seller a unique transaction identification number 137 using transaction identification number generation software 139. The transaction identification number 137 is displayed on both Buyer's and Seller's mobile devices using transaction identification number display software 141 to assist each to locate the other in crowded environments, as many events are, and confirm their identities. In some embodiments, the computing device 105 also employs geolocation comparing software 143 to update both Buyer and Seller with the other's geolocation 119 (e.g., within the venue), further assisting the parties to finalize the exchange.

With the present technology's assistance, the Buyer and Seller can come together face to face to exchange the tickets and, in some cases, payment. In preferable embodiments, payment may also or alternatively be made by the Buyer to the Seller electronically through the application using known methods and technologies, including credit card transactions, electronic bank transfers, PayPal, and the like.

In preferable embodiments, users' mobile devices also employ authentication software 145 to log into the system and verify the users' credentials as well as geolocation software 147 to update the computing device with the users' geolocations 119. In some embodiments, Sellers cannot post listings and/or Buyer's cannot respond to listings unless they are confirmed to be within the venue for which the tickets are applicable. Users' presence in the venue may be determined based on their mobile devices' geolocations 119, based on geotagging metadata associated with photographs taken depicting the tickets offered for exchange, and/or other known means. In some embodiments, the buyer's mobile device 101 also employs ticket search software 149 for generating search parameters 121 and the seller's mobile device 103 also employs ticket posting software 151 for generating and sending ticket info 153 to the computing device 105.

The features and arrangements depicted in FIG. 1 are exemplary and should not be interpreted to limit the present technology's scope, which includes all alterations within the ordinary knowledge and creativity of those skilled in the art.

Figure 2:
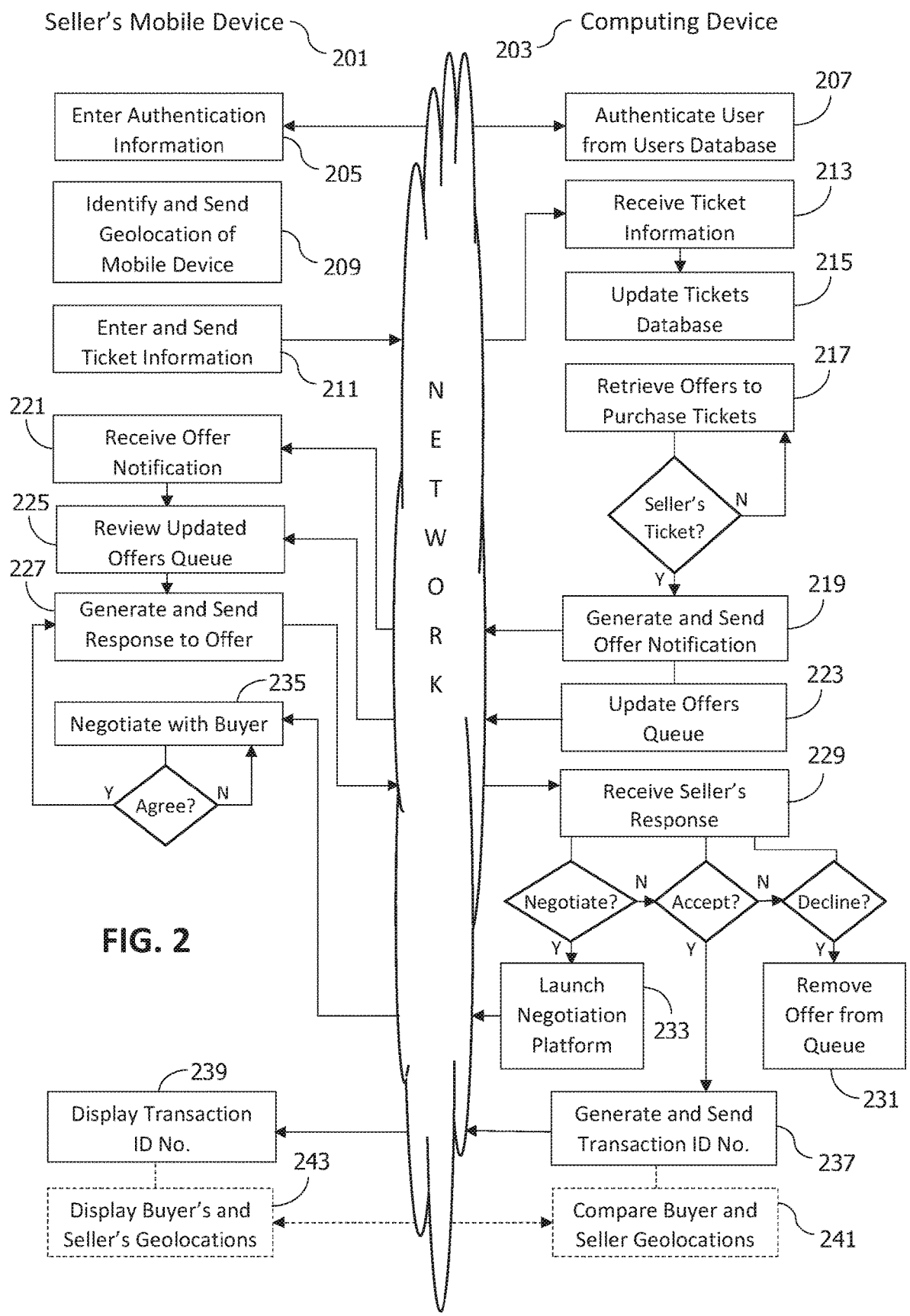
FIG. 2 is a schematic representation of a method that might be employed by the Seller using the system of FIG. 1 according to exemplary embodiments of the present technology.

FIG. 2 depicts, schematically, the steps of a method for posting tickets for sale according to exemplary embodiments of the present technology using the exemplary system depicted in FIG. 1. To post a ticket, a Seller first must enter his or her authentication information 205 to login to the system. The computing device 203 receives the authentication information and compares it with the user database to ensure authentication 207. In some embodiments, the Seller's mobile device 201 also identifies and shares its geolocation 209 with the computing device. In such embodiments, the geolocation of the Seller's mobile device 201 is preferably updated regularly and in real-time. In some embodiments, the Seller is unable to post a ticket if his/her location is not confirmed to be within the venue associated with the ticket, using geolocation identification, geotagging metadata, or other known means.

Once the Seller has logged into the system, he or she may access the ticket posting option, from the home screen in preferable embodiments. The Seller then enters information about the tickets he or she wishes to post 211, preferably including the event name, date, and location, number of tickets/seats available from the Seller, how many of the seats are together, location of the seats, including ticket level, section, seat numbers, etc. In some embodiments, the Seller may also include a photograph of himself with the tickets, preferably from the seats at the event. The photograph will help the Buyer identify the Seller assuming a deal is reached and may show the Buyer exactly where the seats are, for example how close to the stage, field, etc. Metadata from the photograph, including a geotag and data and time stamps, may be used by the system to confirm the Seller's presence inside the venue. In preferable embodiments, the Seller also provides an initial asking price for the tickets, which can be used as a starting point for negotiations with potential Buyers.

Upon receipt of the ticket information 213, the computing device 203 updates the tickets database 215 to include the newly posted tickets. Thereby, the newly posted tickets will be listed in the tickets list in the application for nearby users and available for search by other users interested in the event, date, venue, etc. Potential Buyers can view information about the ticket and, if applicable, the photograph of the Seller and/or tickets via their mobile devices. The system then awaits submission of an offer from a Buyer interested in the Seller's tickets 217. Upon receipt of such an offer, the computing device 203 generates a notification 219 and sends it to the Seller 221 indicating the Buyer's offer. In preferable embodiments, the computing device 203 also updates the offers queue 223 for the associated ticket so that the Seller can review and compare multiple offers simultaneously. Upon reviewing the offer, preferably through the offers queue 225, the Seller can decide whether to accept, decline, counter, or negotiate with the Buyer. The Seller's response 227 is sent over the network to the computing device 203, which receives the response 229 reacts based on the nature of the Seller's response.

If the Seller has declined the Buyer's offer, the computing device preferably updates the offers queue to remove that offer 231 from the Seller's tickets. In some embodiments, the computing device also sends the Buyer a notification that the Seller has declined the offer. If the Seller counters or wishes to negotiate, the computing device can send the Buyer the counteroffer and, in preferable embodiments, launch a negotiation platform 233 which facilitates further discussion between the Buyer and Seller 235.

Once the Seller accepts the Buyer's offer, either immediately following receipt of the offer or after further negotiations/counteroffers 235, the computing device preferably updates the tickets database to remove the exchanged tickets from the available tickets queue and generates a unique transaction identification number 237, which it sends to both the Buyer and Seller, to assist the parties in locating one another in crowded event venues to complete the exchange. The Buyer's and Seller's mobile devices will display the unique transaction identification number 239. In some embodiments, the computing device also compares the geolocations of the Buyer's and Seller's mobile devices 241 to further assist each in locating the other and/or confirm that both are within the venue. The computing device can send geolocation information 241 in the form of a map, geographical distance calculator, or the like, which is likewise displayed to the Buyer and Seller 243. Those skilled in the art will recognize other available techniques for relaying geolocation data.

The steps and interactions depicted in FIG. 2 are exemplary and should not be interpreted to limit the present technology's scope, which includes all alterations within the ordinary knowledge and creativity of those skilled in the art.

Figure 3:
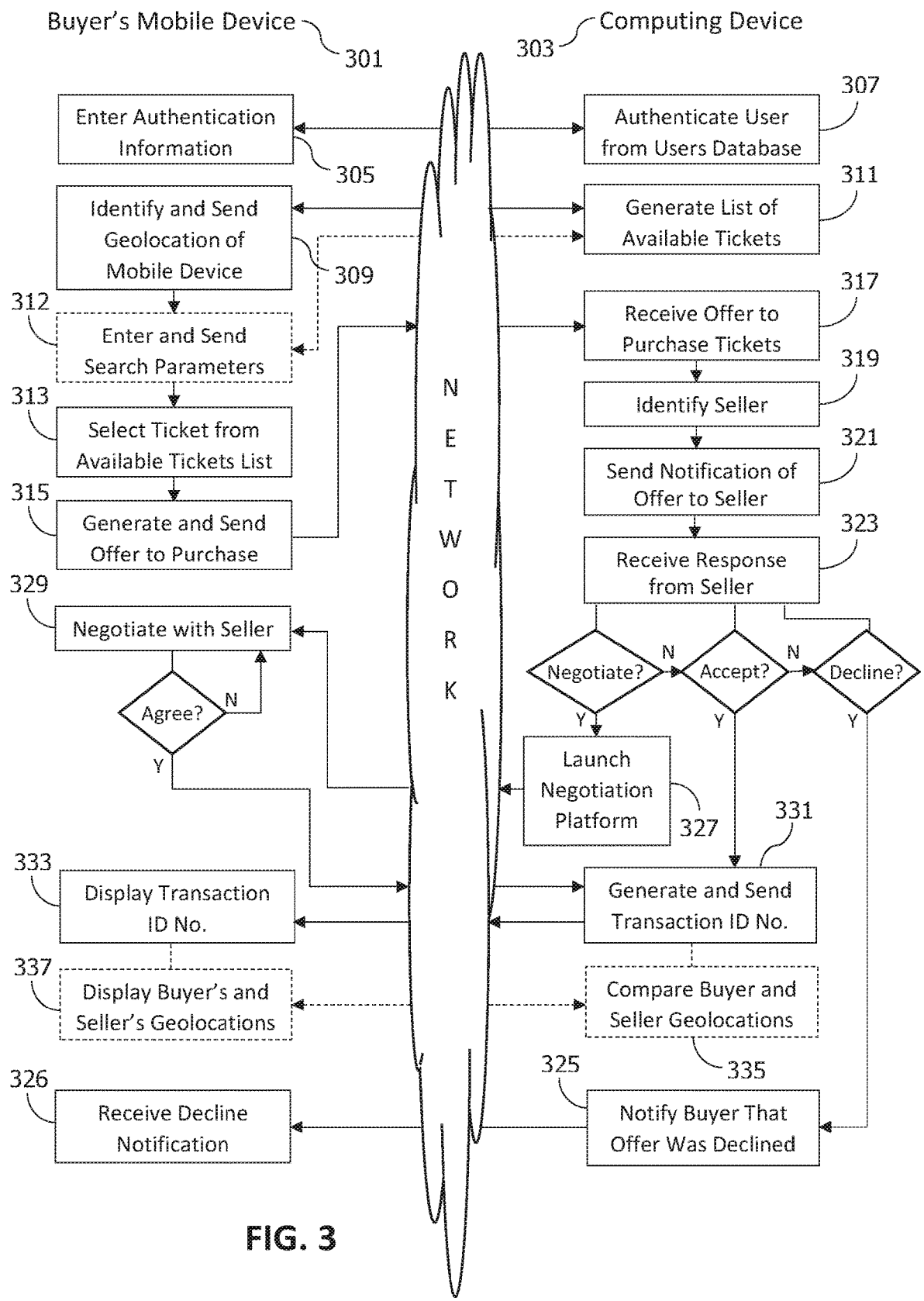
FIG. 3 is a schematic representation of a method that might be employed by the Buyer using the system of FIG. 1 according to exemplary embodiments of the present technology.

FIG. 3 depicts, schematically, the steps of a method for buying tickets according to exemplary embodiments of the present technology using the exemplary system depicted in FIG. 1. The Buyer preferably first enters his or her authentication information 305 to login to the system. The computing device 303 receives the authentication information and compares it with the user database to ensure authentication 307. In preferable embodiments, the Buyer's mobile device 301 sends its geolocation 309 to the computing device, and the computing device generates a list of available tickets 311 posted by Sellers within a defined radial distance from the Buyer's mobile device's geolocation (e.g., within the venue where the Buyer is located). In some embodiments, the Buyer may also send search parameters 313, such as event name, type, date, location, etc. The computing device 303 may use those search parameters to generate an available tickets list 311 more useful to the Buyer.

The Buyer can then view information about the available tickets and, if applicable, photographs of the Sellers and/or tickets via their mobile devices. If the Buyer sees a ticket he or she is interested in purchasing 313, he or she can send an offer to purchase 315 that ticket to the computing device 303. Preferably, the Seller of the ticket is in close proximity to the Buyer at the time of the offer. Even more preferably, the Buyer and Seller are both at the event venue. A user's presence at the venue may be confirmed by his or her mobile device's geolocation, using geotag metadata from the user's photographs of his or her tickets, or other known methods. Upon receiving the Buyer's offer 317, the computing device 303 identifies the Seller 319 of the ticket and sends the Seller a notification 321 of the Buyer's offer. The computing device 303 then awaits a response from the Seller 323, which may relay that the Seller accepts, declines, counters, or wishes to negotiate with the Buyer. If the Seller has declined the offer, the computing device preferably sends the Buyer a notification that the offer was declined 325. If the Seller counters or wishes to negotiate, the computing device 303 preferably sends the Buyer the Seller's counteroffer and/or launches a negotiation platform 327 to facilitate further discussions between the Buyer and Seller 329.

Once the Seller accepts the Buyer's offer, either immediately following receipt of the offer or after further negotiations and/or counteroffers, the computing device 303 preferably updates the tickets database to remove the exchanged tickets from the available tickets queue and generates a unique transaction identification number 331, which it sends to both the Buyer and Seller, to assist the parties in locating one another in crowded event venues to complete the exchange.

The Buyer's and Seller's mobile devices display the unique transaction identification number 333 which the parties can display to locate one another and/or confirm their identities. In some embodiments, the computing device 303 also compares the geolocations of the Buyer's and Seller's mobile devices 335 to further assist each in locating the other. The computing device 303 can send geolocation information in the form of a map, geographical distance calculator, or the like, which is likewise displayed to the Buyer and Seller 337. Those skilled in the art will recognize other available techniques for relaying geolocation data.

The steps and interactions depicted in FIG. 3 are exemplary and should not be interpreted to limit the present technology's scope, which includes all alterations within the ordinary knowledge and creativity of those skilled in the art.

Figure 4:
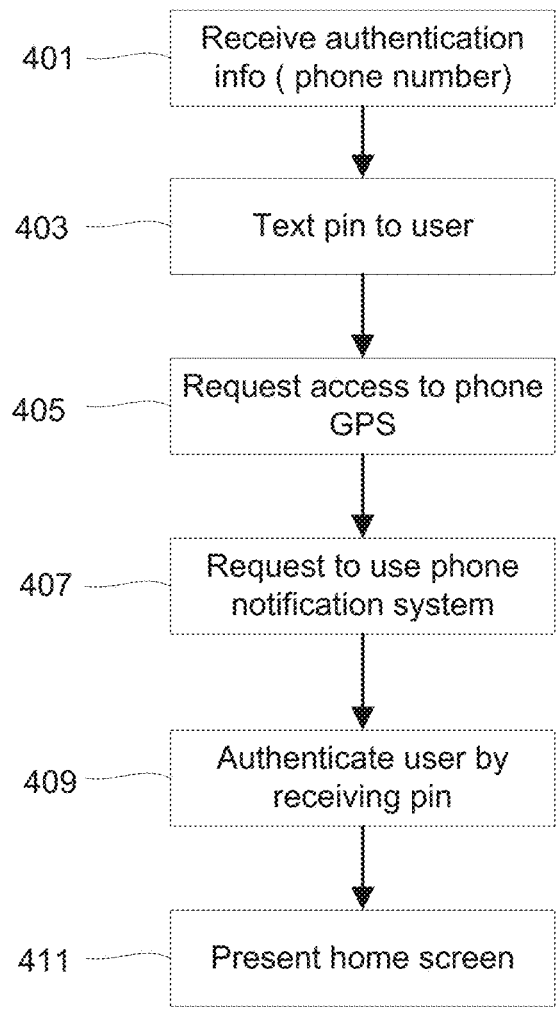
FIG. 4 is a schematic representation of a method of authenticating a user of the system of FIG. 1 according to exemplary embodiments of the present technology.

FIG. 4 depicts, schematically, the steps of an exemplary method for authenticating a user attempting to access a system employing the present technology. The system receives an authentication attempt 401 from the user. In some embodiments, only the user's mobile phone number is required to authenticate the user. In some embodiments, additional or alternative information, such as user name and/or other profile information, may be used to authenticate. Upon receipt of the user's authentication information, the system sends a pin 403 over the network to the user's mobile device. The pin may be sent by any known method, including text message, email, data transfer, etc.

The system also requests access to the mobile device's GPS 405 and requests use of the mobile device's notification system 407. Certain embodiments of the system use GPS access for various functions, including populating listed ticket offerings, verifying a user's presence at a venue location, and assisting users who have agreed to exchange tickets in locating one another. Likewise, embodiments of the system use access to the mobile device's notification system for various functions, including notifying a user of a new ticket listing, notifying a Seller of an offer on one or more tickets the Seller listed, and facilitating discussions using the system's negotiation platform. Notifications may be sent as push notifications in some embodiments or through other known methods, such as text or data messages or via email. Upon receiving the user's pin, the system authenticates the user by verifying the pin 409 and then grants the user access to the system. In some embodiments, the system launches a home screen 411 upon authentication of the user. In some embodiments, a user may use settings to determine what screen he or she wants to see upon authentication, such as a list of tickets available nearby, etc. The pin authentication method depicted in FIG. 4 helps to ensure that actual human users are accessing the system and to avoid use of the system by "bots," as will be understood by those of ordinary skill in the art.

Figure 5:
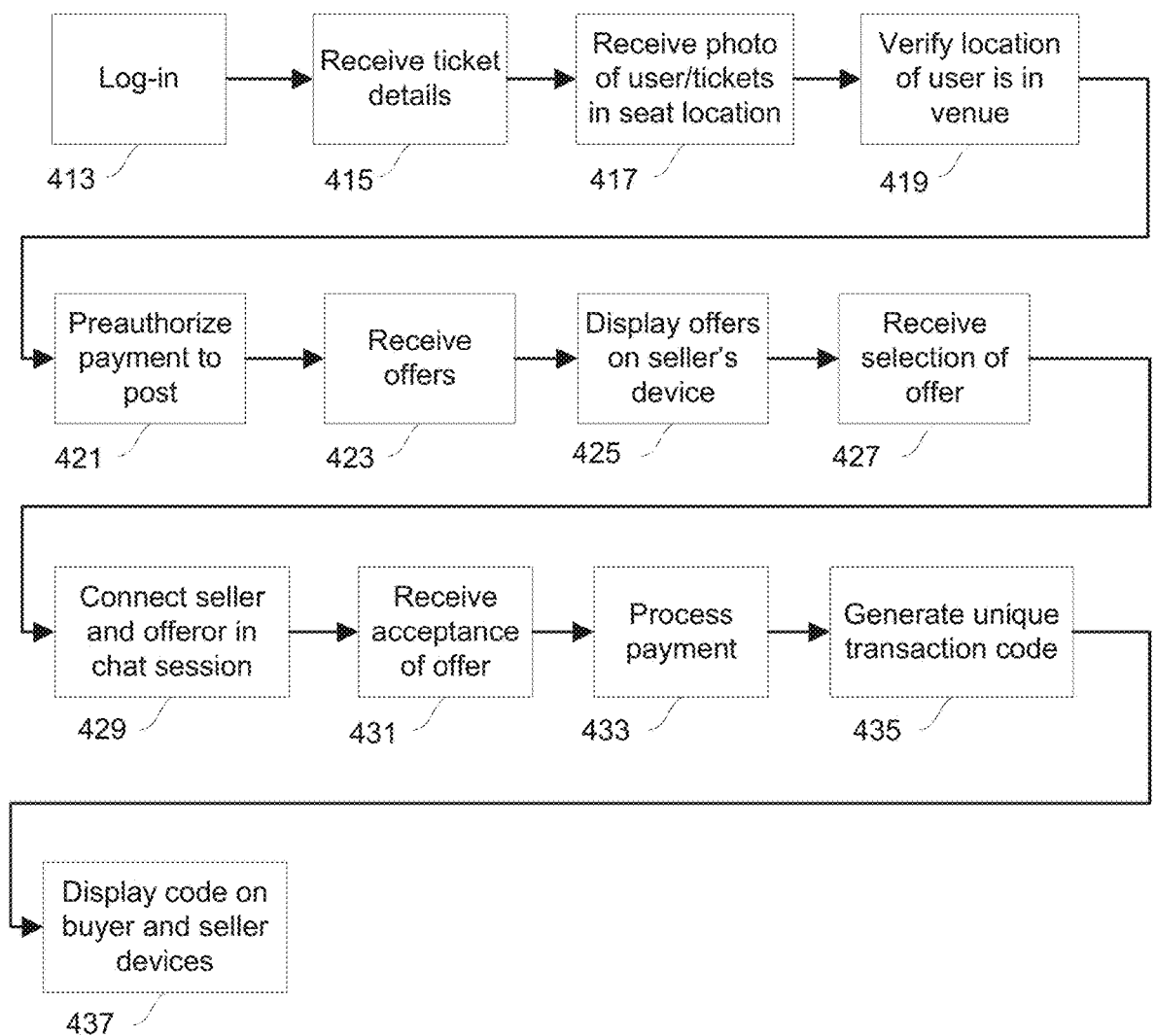
FIG. 5 is a schematic representation of a method of using the system of FIG. 1 according to exemplary embodiments of the present technology.

FIG. 5 depicts, schematically, the steps of an exemplary method for selling tickets using a system employing the present technology. The system first accepts a user's log-in 413 authentication information upon which the user is granted access to the system. The user then provides and the system receives details about the tickets 415 the user is seeking to sell. In some embodiments, ticket details may include event name, date of event, number of tickets, whether or not the tickets are seated together, level, section, row, seat number, box number, and/or asking price. In some embodiments, the system also requires a photograph of the tickets themselves and a photograph of the owner of the tickets inside the venue or, in some embodiments, in the seats themselves. In such embodiments, metadata tags verifying the photograph was taken inside the venue and on the day of the event may be used to protect against violations of "scalping" laws and venue policies.

Upon receiving the photographs of the tickets and their owner in the seats 417 and verifying the Seller's location is in the venue 419, the system requests that the Seller preauthorize a payment in order to post the tickets 421, in some embodiments. Location of the Seller may be determined by geolocation of the phone and/or the system analyzing geotags in the photograph. The system may also utilize GPS technology and/or indoor positioning systems, such as Apple's iBeacon, Google's Eddystone, and the like, in such embodiments. In some embodiments, and depending on particular users' settings, the system may send notifications to potentially interested Buyers via push notifications, text message, email, or the like. For example, the system might target users whose mobile device geolocations indicate that they are at the venue and might therefore be interested in purchasing the newly listed tickets. The system can then receive offers 423 from interested Buyers, in some embodiments notify the Seller of new offers, again using push notifications, text messages, email, or other known methods, and display the offers on the Seller's mobile device 425. The system then recognizes when a Seller has selected an offer to view 427 and can facilitate negotiations by launching the negotiation platform to connect the parties 429. Upon agreement between the Buyer and Seller, the system receives acceptance of an offer 431 and processes a payment 433 from the Buyer to the Seller for the tickets, in some embodiments. The system may also generate a unique transaction code 435 and display the code on both Buyer and Seller mobile devices 437 to help facilitate the parties meeting to exchange the tickets. As those of ordinary skill in the art will recognize, this is just one of many methods of employing the present technology to facilitate a ticket sale.

Figure 6:
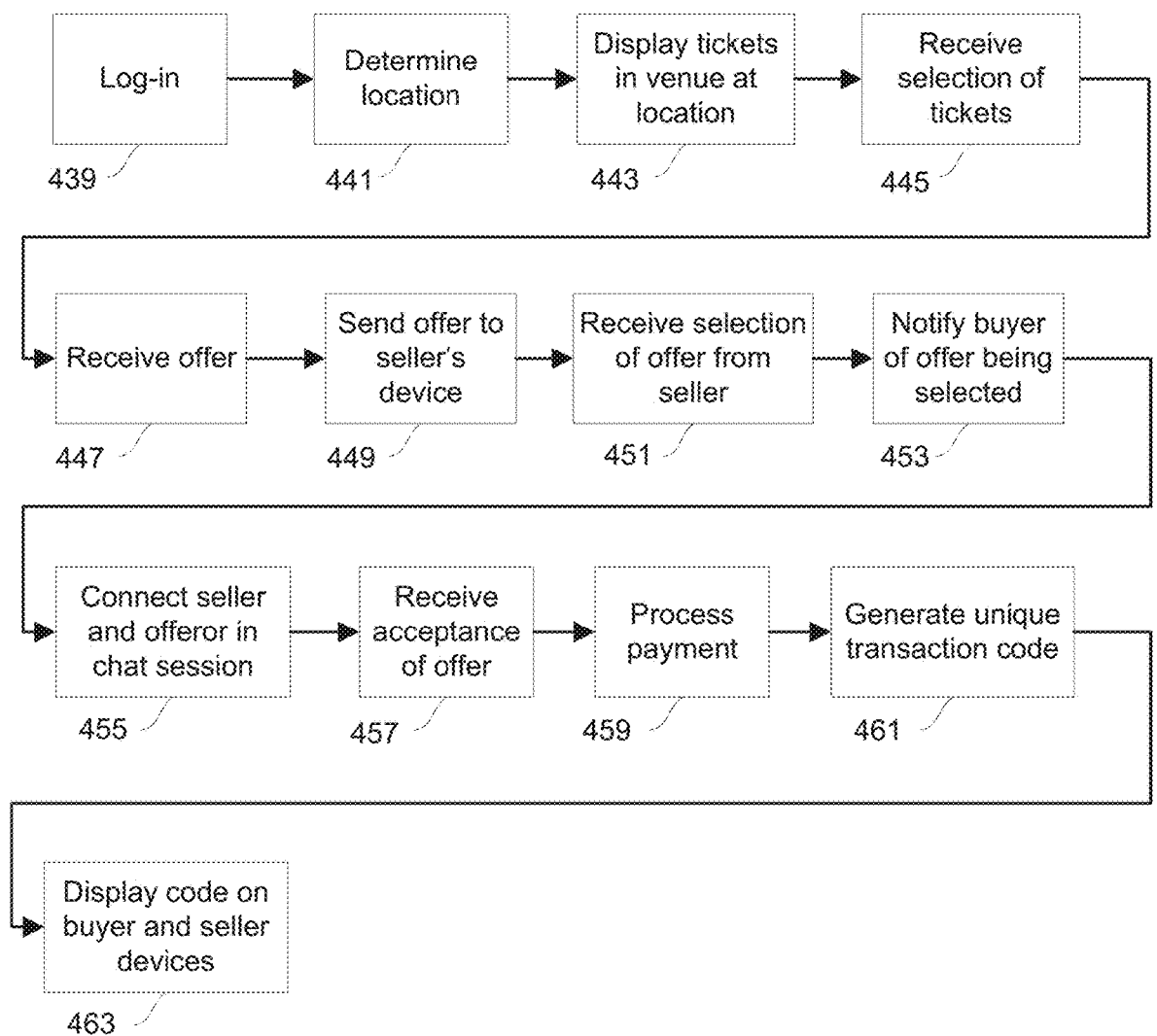
FIG. 6 is a schematic representation of a method of using the system of FIG. 1 according to exemplary embodiments of the present technology.

FIG. 6 depicts, schematically, the steps of an exemplary method for buying tickets using a system employing the present technology. The system first accepts a user's log-in 439 authentication information upon which the user is granted access to the system. The system then determines the user's location 441, preferably using geolocation technology from the user's mobile device. Geolocation may also be determined using iBeacon or other known methods, as will be understood by those of ordinary skill in the art. In some embodiments, the system requires the buyer to take and upload a photograph of themselves in the venue from which the buyer's location can be visually inspected and the system can analyze geotag information of the photograph. The system can then display available tickets 443 that the user might be interested in. In some embodiments, the list may be populated only with tickets available at the venue the Buyer is currently at. In some embodiments, tickets within a certain geographic radius of the user might be listed. In some embodiments, the user can provide search criteria to the system to find tickets the user is interested in. Ticket information is preferably stored in the tickets database, which is preferably searchable by the users using the system.

The system detects when a user selects one or more tickets 445 from the available tickets list. The system also enables the user to make an offer for the tickets. In some embodiments, if the Seller has listed an asking price, the Buyer may be permitted to complete the sale simply by offering the amount requested by the Seller. In other embodiments, a Buyer may be required to make the initial offer, which the Seller is then able to accept, decline, or counter. Upon receiving the details of a Buyer's offer 447, the system transmits the offer 449 to the Seller of the tickets in question. In some cases, the Seller may have multiple offers, and the system preferably displays the offers to the Seller in list form. The Seller can then select an offer 451 and perform several actions, including accepting, declining, countering, or negotiating with the Buyer through the system's negotiation platform. In some embodiments, the system will then notify the Buyer 453 of the Seller's interest in the offer. And the system can connect the Buyer and Seller 455 through the negotiation platform to finalize the transaction.

Upon receipt of the parties' agreement and the acceptance of an offer 457, the system will process payment 459, in some embodiments, and generate 461 and display 463 a unique transaction code on both Buyer and Seller devices. This unique transaction code helps the parties to locate one another in large, crowded venues, as is common at a concert, show, sporting event, etc. Some embodiments of the system further assist the parties in locating one another by comparing the geolocations of their mobile devices. The system can assist using geolocation information in the form of a map, geographical distance calculator, or the like, which is displayed on Buyer and Seller mobile devices along with the unique transaction code.

Figure 7:
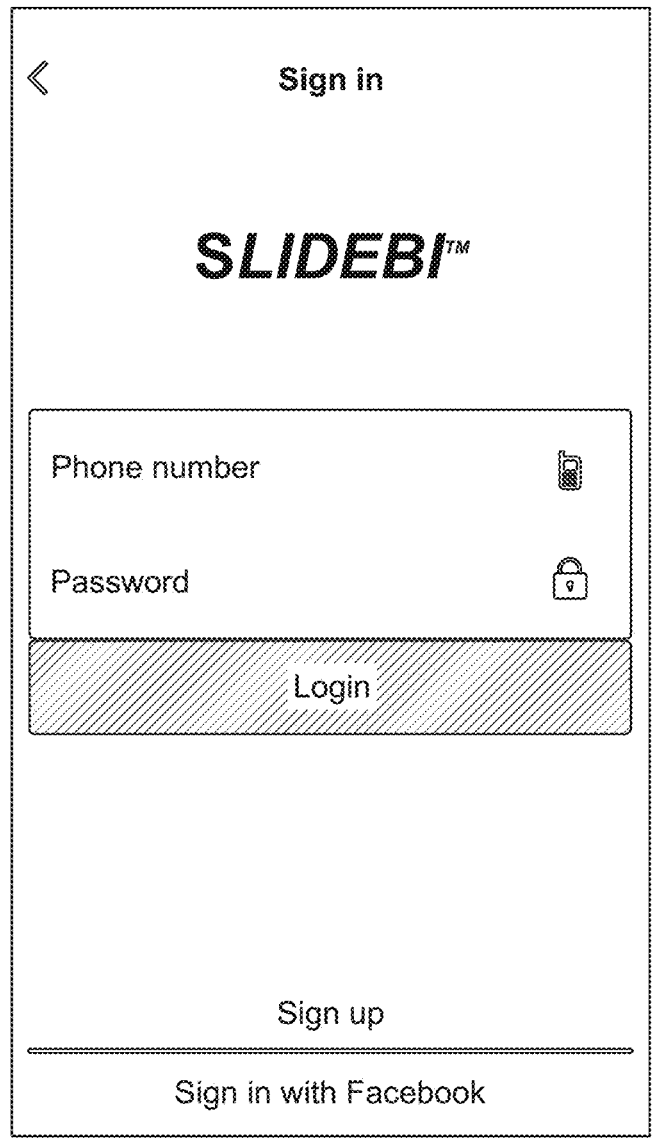
FIG. 7 is a depiction of a login screen employed by exemplary embodiments of the system of FIG. 1 according to exemplary embodiments of the present technology.
Figure 8:
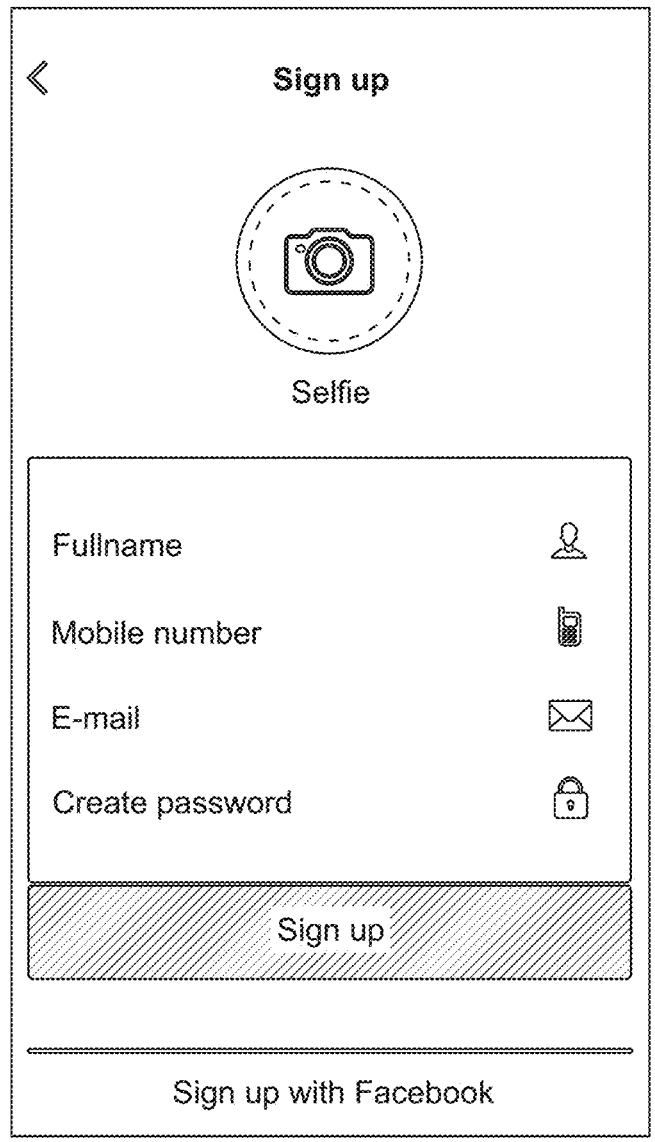
FIG. 8 is a depiction of a sign-up screen employed by exemplary embodiments of the system of FIG. 1 according to exemplary embodiments of the present technology.
Figure 10:
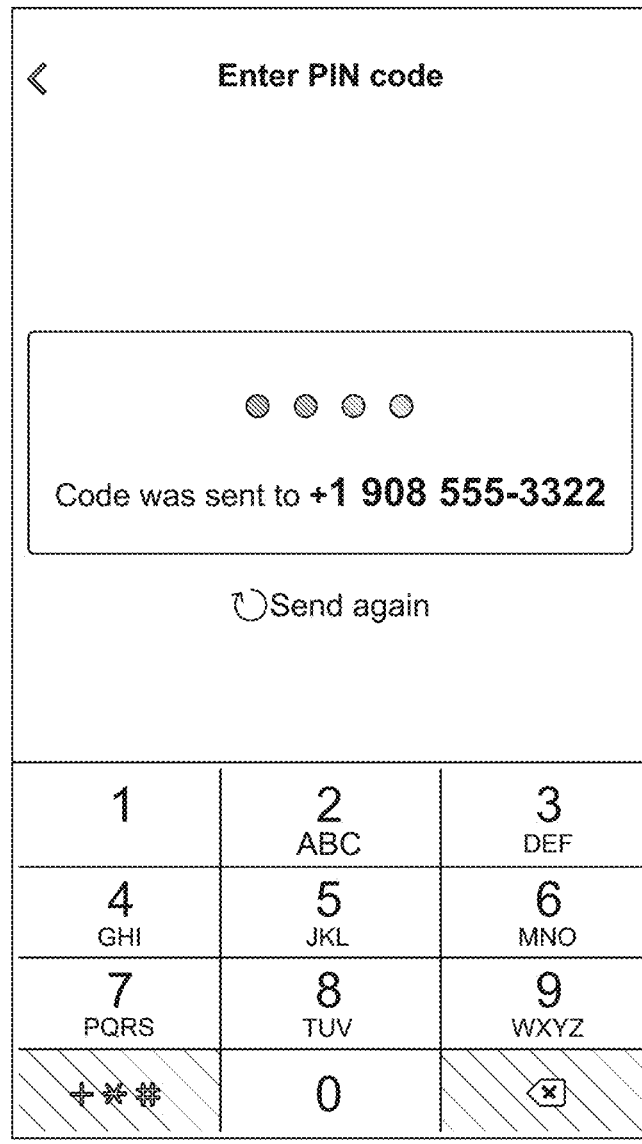
FIG. 10 is a depiction of a PIN-code-entry screen employed by exemplary embodiments of the system of FIG. 1 according to exemplary embodiments of the present technology.

FIG. 7 depicts a sign-in page for a mobile application employing exemplary embodiments of the present technology. FIG. 8 depicts a sign-up page for a mobile application employing exemplary embodiments of the present technology. New users can create a profile with information about themselves, preferably including their name, number, e-mail, password, and an identifiable image. The information is preferably stored in the users database. FIG. 10 depicts a pin code verification page for a mobile application employing exemplary embodiments of the present technology. As discussed with respect to FIG. 4, the pin code authentication process helps to prevent use of the system by "bots."

Figure 9:
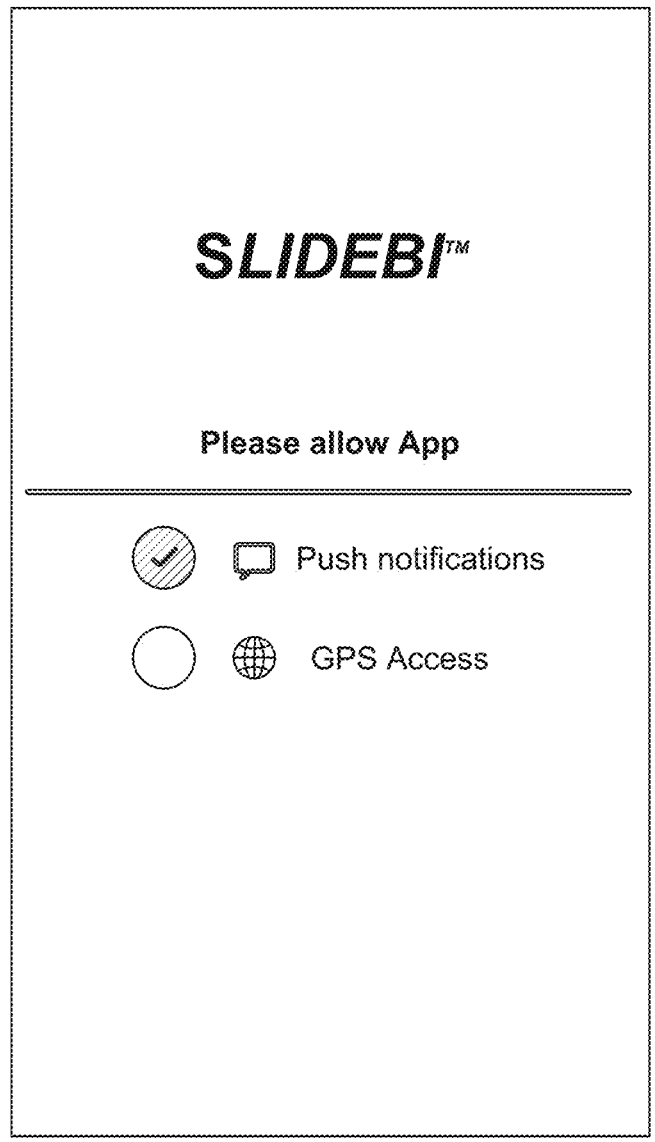
FIG. 9 is a depiction of a permissions screen employed by exemplary embodiments of the system of FIG. 1 according to exemplary embodiments of the present technology.

FIG. 9 depicts a request for access to push notification and GPS services from the user's mobile device by a mobile application employing exemplary embodiments of the present technology. Push notifications may be used, in some embodiments, to notify users of newly posted tickets, offers on tickets the user posted for sale, acceptance, rejection, and counters to an offer, etc. Push notifications are the preferred method of notification. GPS information is used in preferable embodiments for identifying users' locations, identifying tickets available for a venue a user is currently at, facilitating the physical exchange of tickets once the parties have completed a transaction, etc. Other location identification methods can be used as well, including indoor positioning systems, such as Apple's iBeacon, Google's Eddystone, and the like, geotagging on user photographs, etc. Those of ordinary skill in the art will recognize other alternatives, applications, and arrangements as well. In some embodiments, the request for access also obtains access to the user's camera for use with the system. In some embodiments, the system prevents access to stored photographs during use of the system to ensure that, during an exchange transaction, photographs are taken live in the venue for visual and geotag location verification purposes.

Figure 11:
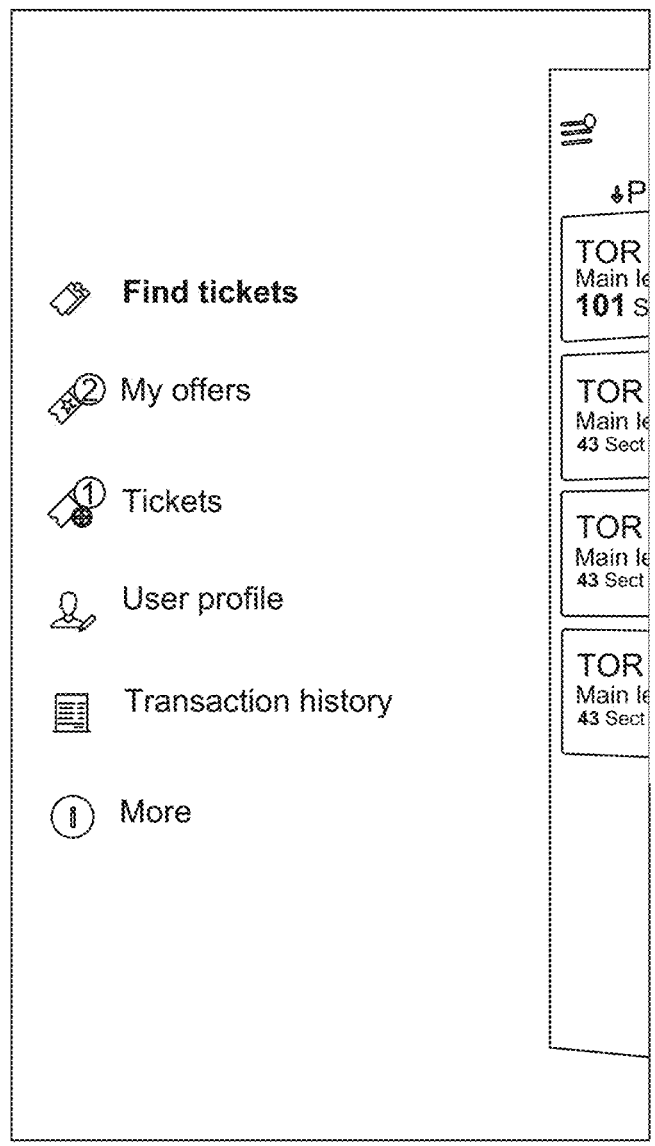
FIG. 11 is a depiction of a main menu screen employed by exemplary embodiments of the system of FIG. 1 according to exemplary embodiments of the present technology.

FIG. 11 depicts a home page or "menu" for a mobile application employing exemplary embodiments of the present technology. Preferable embodiments will allow users to search for tickets, post tickets for sale, review offers for tickets they posted for sale, update their user profiles, etc. FIG. 12 depicts an available tickets page for a mobile application employing exemplary embodiments of the present technology. Preferable embodiments provide information about the available tickets, including event, venue, date of event, number of tickets, whether the tickets are seated together, seat level, section, row, seat number, and box number, if applicable, and Seller asking price. In some instances, a Seller may be seeking to exchange tickets with another attendee rather than simply selling his or her own tickets. Such information is also preferably provided on the available tickets page, as depicted in FIG. 12.

FIG. 13 depicts a post tickets page for a mobile application employing exemplary embodiments of the present technology. Preferable embodiments include information about the event, venue, event date, number of tickets, whether the tickets are seated together, seat level, section, row, seat number, and box number, if applicable, and the Seller's asking price. In some embodiments, the Seller can also indicate that he or she is seeking a ticket exchange rather than just selling his or her own tickets.

Figure 14:
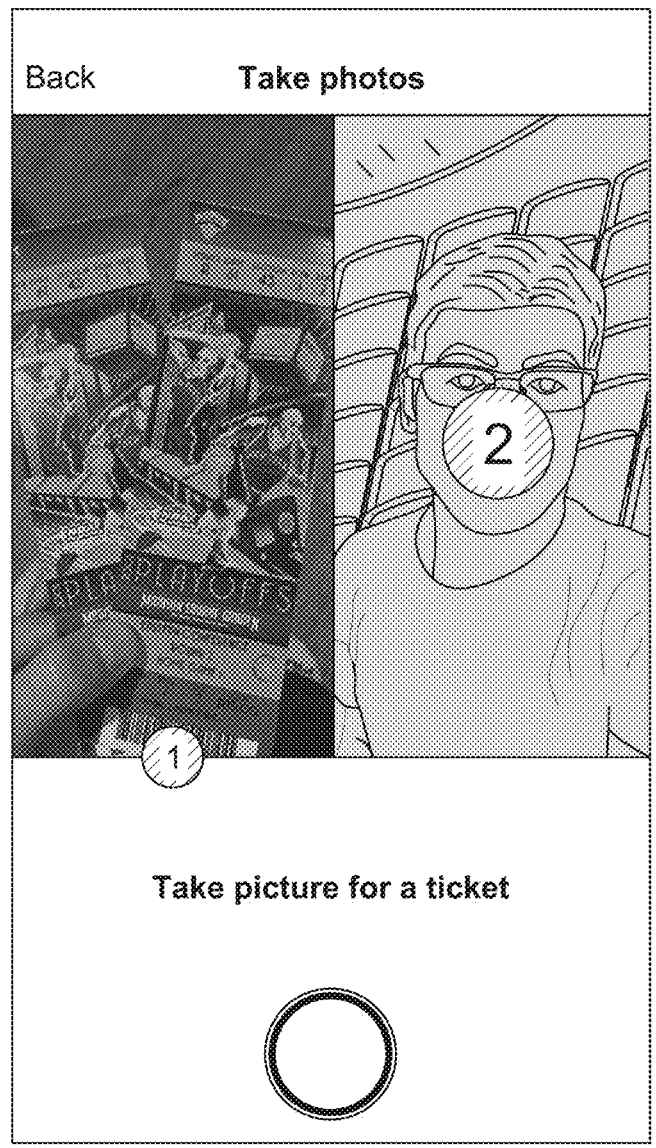
FIG. 14 is a depiction of a take-photos screen for posting tickets employed by exemplary embodiments of the system of FIG. 1 according to exemplary embodiments of the present technology.
Figure 15:
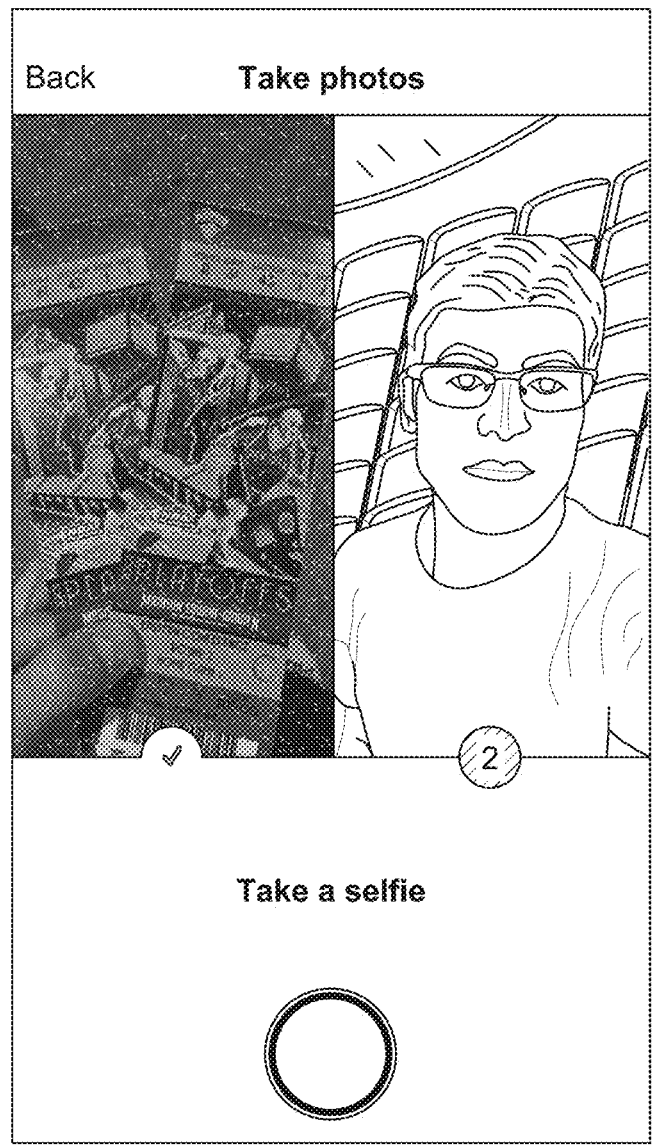
FIG. 15 is a depiction of a take-photos screen for posting tickets employed by exemplary embodiments of the system of FIG. 1 according to exemplary embodiments of the present technology.

FIGS. 14 and 15 depict a part of the ticket posting process according to exemplary embodiments of the present technology. Preferably, the mobile application employing the present technology receives photographs of the tickets and/or the Seller present in the seats at the venue. In this manner, the Buyer can verify the Seller's legitimacy and see the seats themselves and the view of the stage, field, etc. at the time of purchase. In addition, in some embodiments, metadata from the photographs, such as geotags and date and time stamps, may be used by the system to verify the Seller's presence at the venue at the time the tickets are posted. Such embodiments also help to ensure the Seller is not in violation of "scalping" laws or policies.

Figure 16:
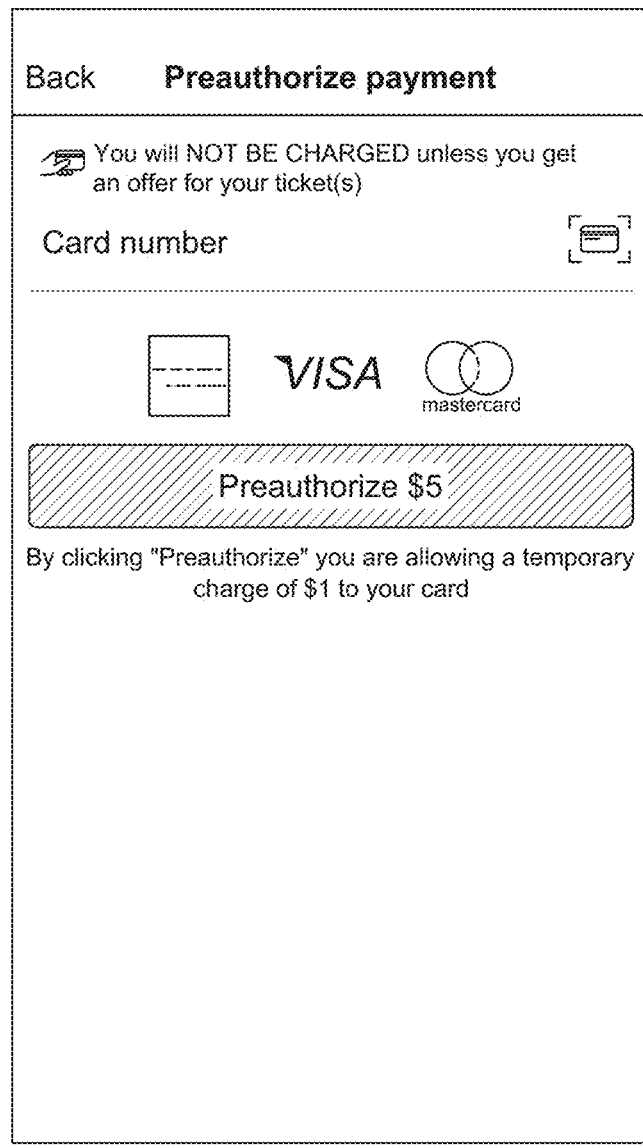
FIG. 16 is a depiction of a preauthorize-payment screen for posting tickets employed by exemplary embodiments of the system of FIG. 1 according to exemplary embodiments of the present technology.
Figure 17:
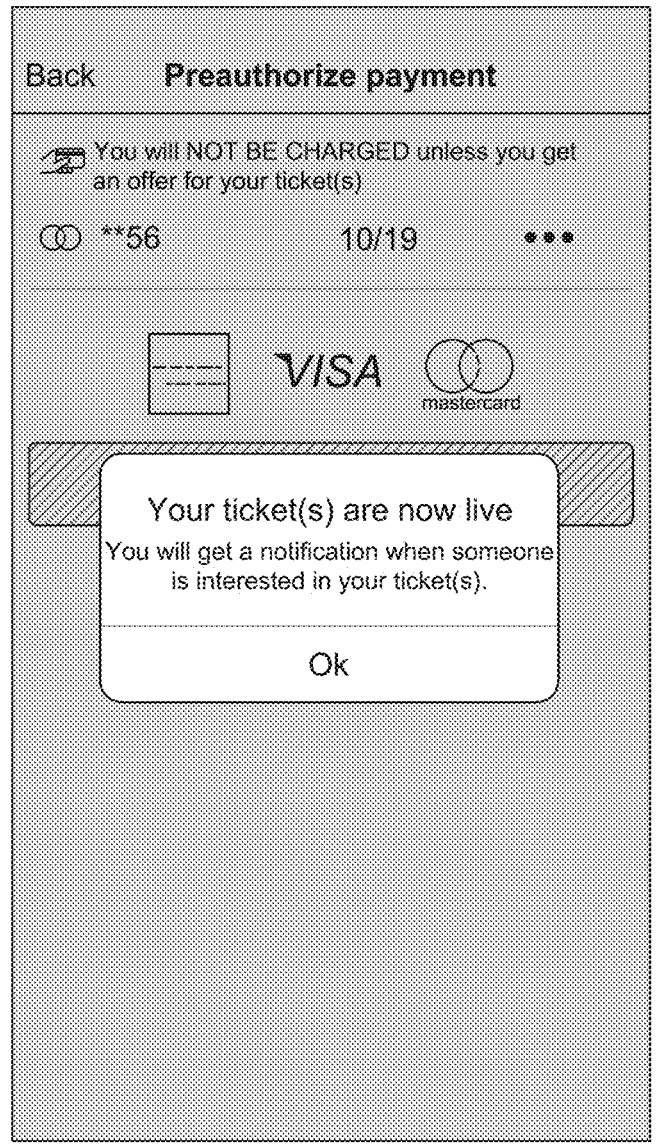
FIG. 17 is a depiction of a confirmation indicating that tickets have been posted employed by exemplary embodiments of the system of FIG. 1 according to exemplary embodiments of the present technology.

FIG. 16 depicts a preauthorize payment page for a mobile application employing exemplary embodiments of the present technology. The Seller is preferably presented with this page upon submitting tickets for sale. If the tickets are ultimately sold through the application, the system charges the Seller's credit card, a $5 charge in the instance depicted. This charge is retained by the system or system administrator as a fee for using the system, while the payment for the tickets goes directly to the Seller. No charge will occur until a sale has completed, but preferable embodiments require the Seller's preauthorization of that charge to successfully post the tickets. As depicted in FIG. 17, the Seller's tickets "go live" upon submission of the Seller's credit card information through the preauthorize payment page on the mobile application. In preferable embodiments, the system sends notifications to other users that new tickets have been posted, in the form of push notifications, text messages, emails, or otherwise.

Figure 18:
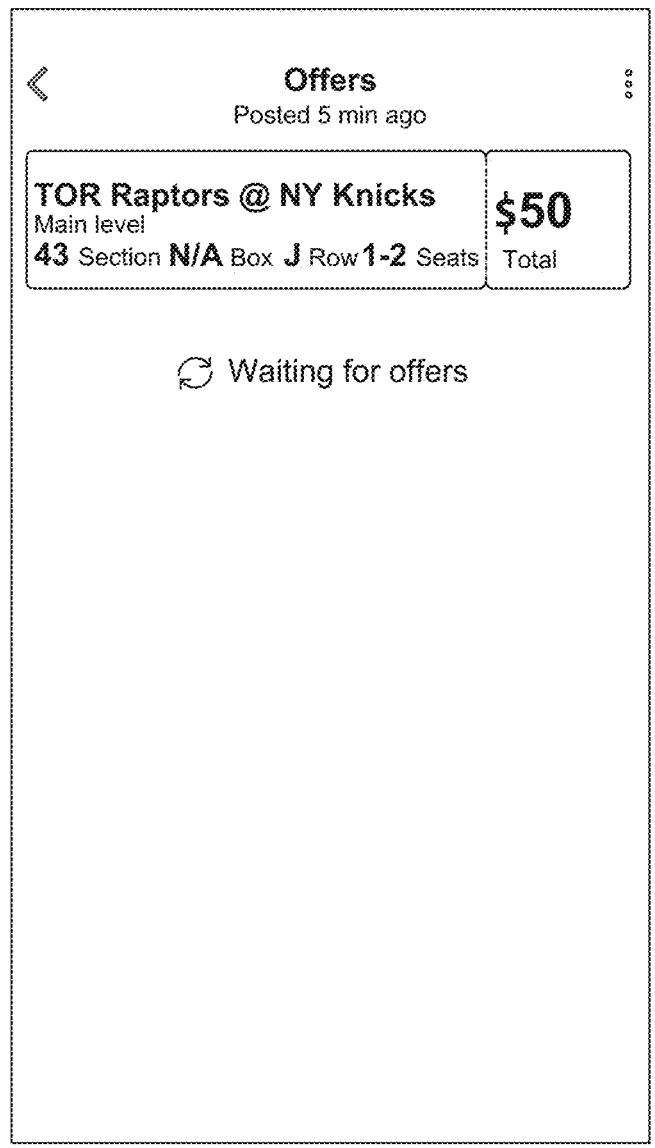
FIG. 18 is a depiction of an offers screen employed by exemplary embodiments of the system of FIG. 1 according to exemplary embodiments of the present technology.
Figure 19:
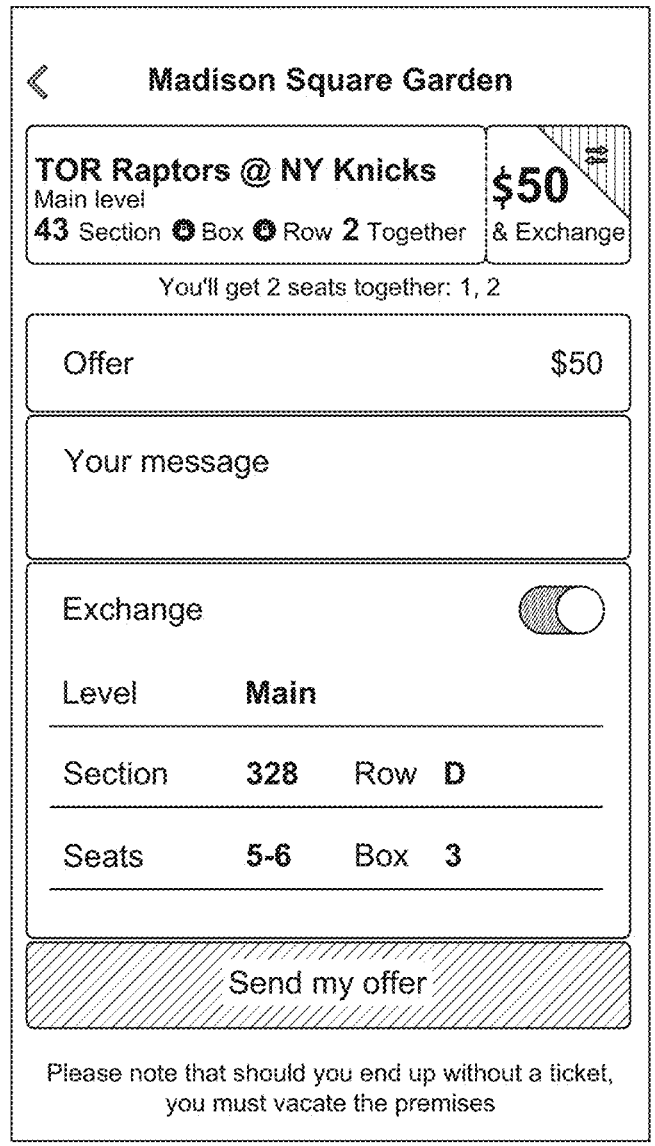
FIG. 19 is a depiction of a submit-offer screen employed by exemplary embodiments of the system of FIG. 1 according to exemplary embodiments of the present technology.

FIG. 18 depicts an offers page for a mobile application employing exemplary embodiments of the present technology. In the depicted situation, the Seller's posted tickets are reflected at the top and no offer has yet been received. In preferable embodiments, the system sends the Seller a notification upon receipt of an offer on the Seller's tickets. FIG. 19 depicts a page for a potential Buyer to make an offer on tickets using a mobile application employing exemplary embodiments of the present technology. Preferable embodiments of the depicted offer platform allow the potential Buyer to set an offer amount, relay a message to the Seller, and offer the Buyer's own ticket(s) in exchange for those the Seller is selling, as depicted. In some embodiments, if a potential Buyer is offering to exchange his or her own tickets, the application may seek photographs of the Buyer's tickets and the Buyer in his or her seats at the venue. Such embodiments helps to ensure the Buyer's legitimacy in the tickets he or she is offering for exchange and preferably help to ensure the Buyer is not in violation of "scalping" laws or policies by confirming the Buyer's presence at the venue at the time he or she offers the exchange.

Figure 20:
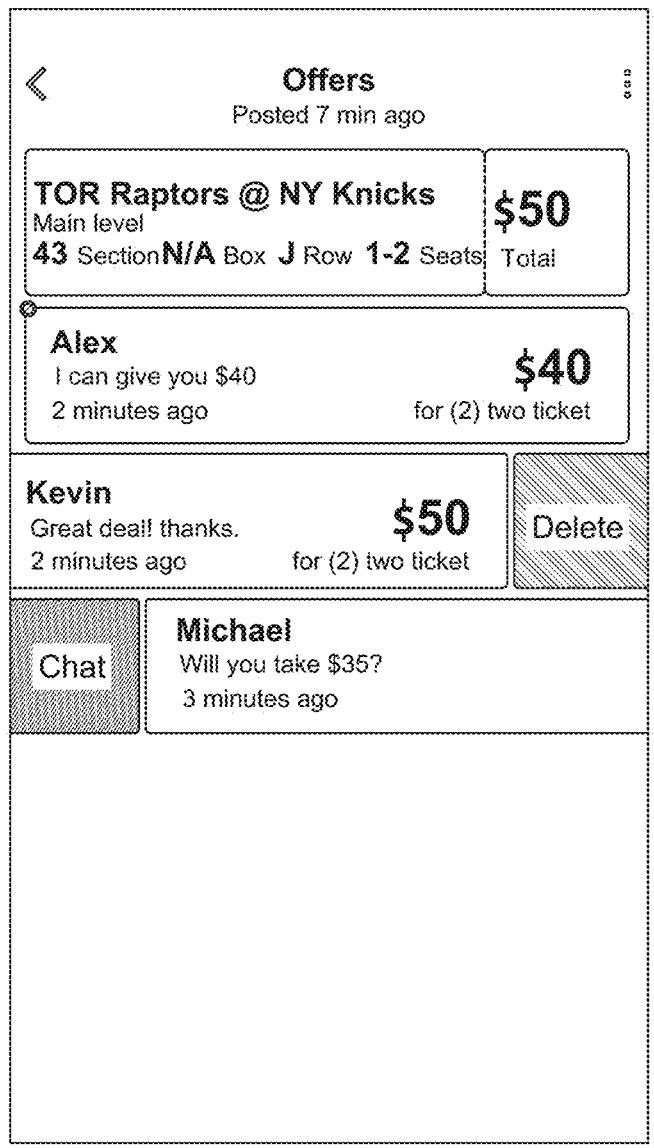
FIG. 20 is a depiction of a current-offers screen employed by exemplary embodiments of the system of FIG. 1 according to exemplary embodiments of the present technology.

FIG. 20 depicts an updated offers page for a mobile application employing exemplary embodiments of the present technology, in this instance including several offers for the Seller's tickets. Preferable embodiments include information about the offers themselves, including the offered price, any message from the potential Buyer, and if the Buyer is offering any tickets in exchange. As noted, preferable embodiments of the application notify the Seller upon receipt of any offer on tickets the Seller has posted. Notifications are preferably presented using push notifications on the Seller's mobile device but may also or alternatively be sent via text message, email, or other means. To review an offer, the Seller may select it using the mobile device's pointing device, which preferably launches an offer review page through which the Seller can accept, decline, or counter the offer or open the application's negotiation platform.

Preferable embodiments also allow the Seller to swipe left or right on an offer to display options, as depicted. In the depicted instance, swiping Kevin's offer to the left has provided the Seller with the option to "delete" the offer while swiping Michael's offer to the right has given the Seller the option to launch the negotiation platform. As those of skill in the art will recognize, other options for swiping right or left are also possible, such as an option to "accept" the offer as presented or counter the offer. In preferable embodiments, selecting the "delete" option acts to decline the Buyer's offer, which preferable initiates a notification from the application to the Buyer that his or her offer has been declined. Likewise, selecting an "accept" option would act to complete the sale, notify the Buyer that his or her offer was accepted, and launch the application's confirmation screen.

Figure 21:
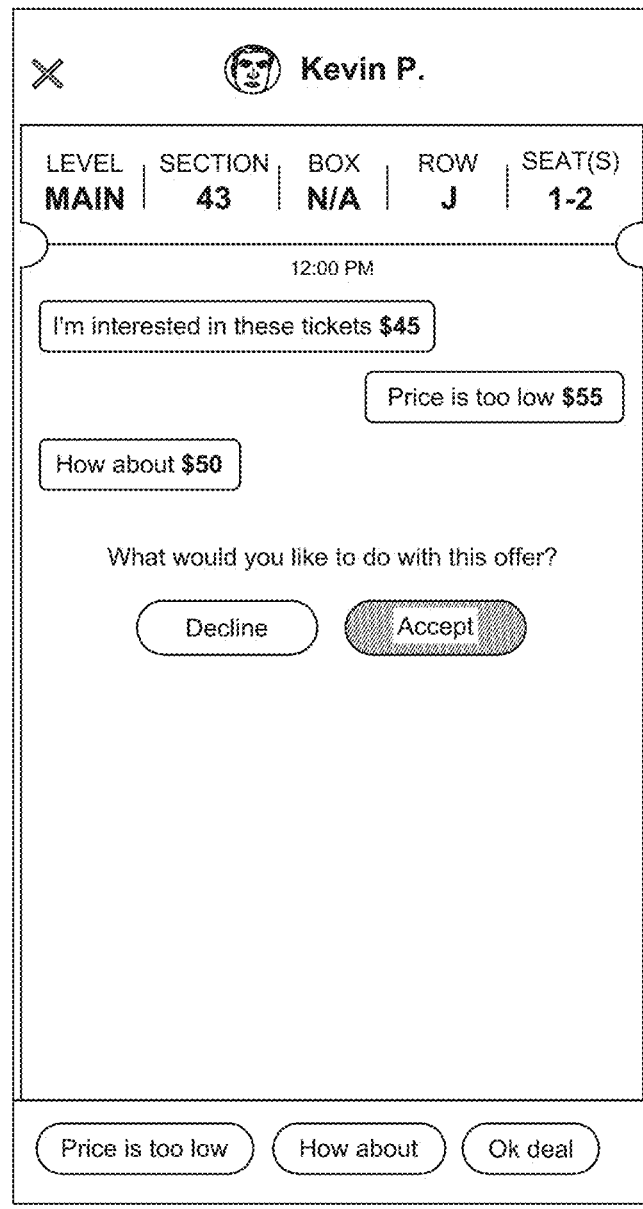
FIG. 21 is a depiction of a negotiation platform employed by exemplary embodiments of the system of FIG. 1 according to exemplary embodiments of the present technology.

FIG. 21 depicts a negotiation platform for a mobile application employing exemplary embodiments of the present technology. Upon receiving an offer, the Seller may launch the negotiation platform to finalize the deal with the Buyer. As depicted, the negotiation platform also preferably includes options to "accept" or "decline" after negotiations have concluded. A party's decision to accept or decline may be indicated by selecting a dialog box, as depicted, by swiping the mobile device's screen in one direction or another, etc. Those of ordinary skill in the art will recognize other available methods for indicating a party's decision.

Figure 22:
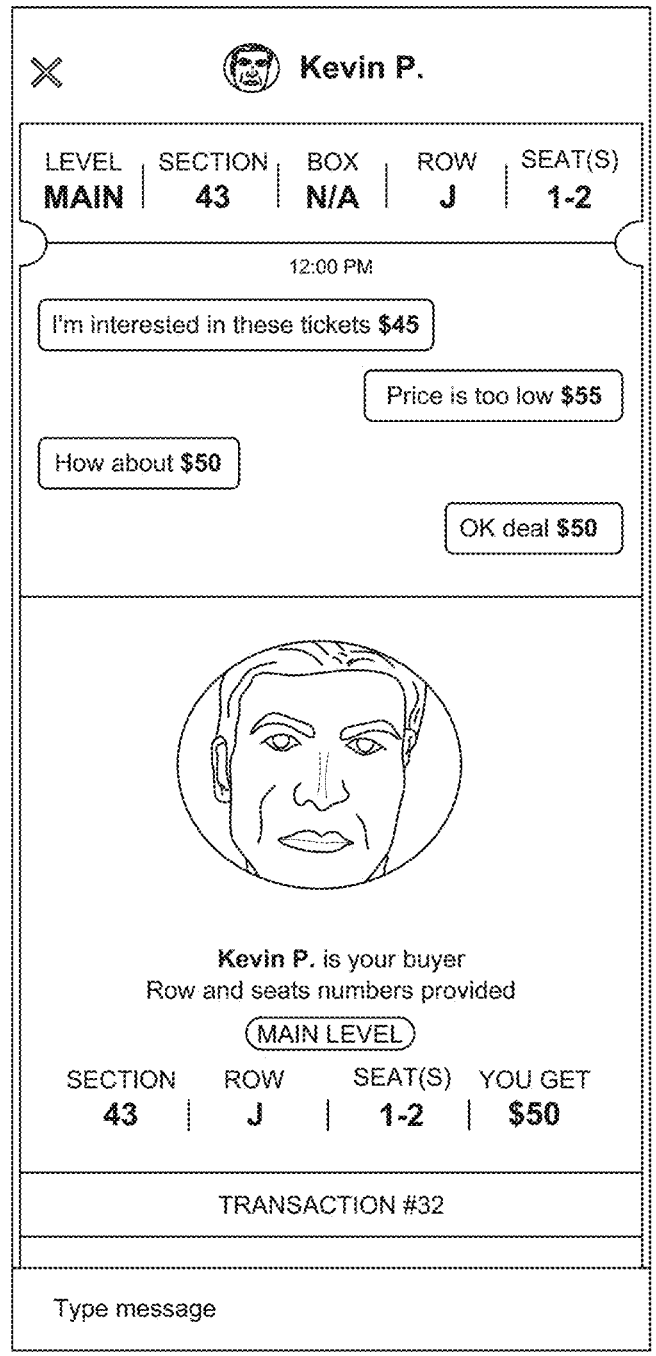
FIG. 22 is a depiction of a negotiation platform employed by exemplary embodiments of the system of FIG. 1 according to exemplary embodiments of the present technology.
Figure 23:
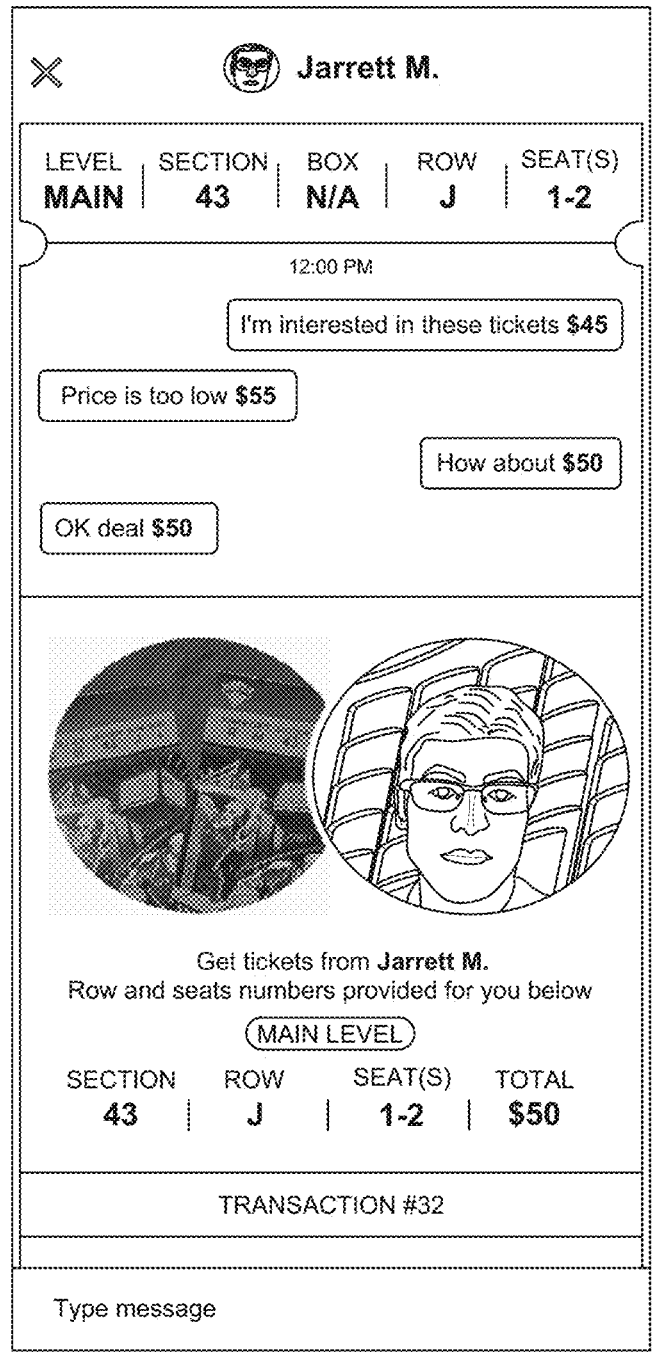
FIG. 23 is a depiction of a negotiation platform employed by exemplary embodiments of the system of FIG. 1 according to exemplary embodiments of the present technology.

Some embodiments include particular communication options, as depicted at the bottom of FIG. 21. Some embodiments permit the users to chat through the negotiation platform as well. Once the parties have reached an agreement, the negotiation platform preferably provides Buyer and Seller information about the other party to the transaction, as depicted in FIGS. 22 and 23. The Seller's negotiation window (FIG. 22) preferably displays the Buyer's photograph as well as the Buyer's current seat information at the venue, if applicable. The Buyer's negotiation window (FIG. 23) preferably displays the photographs the Seller took of the tickets and of the Seller at the seats in the venue. If the Buyer has offered his or her own tickets in exchange, the photographs of the Buyer's tickets and of the Buyer at the seats in the venue are preferably included in the same manner as the Seller's photographs.

Figure 24:
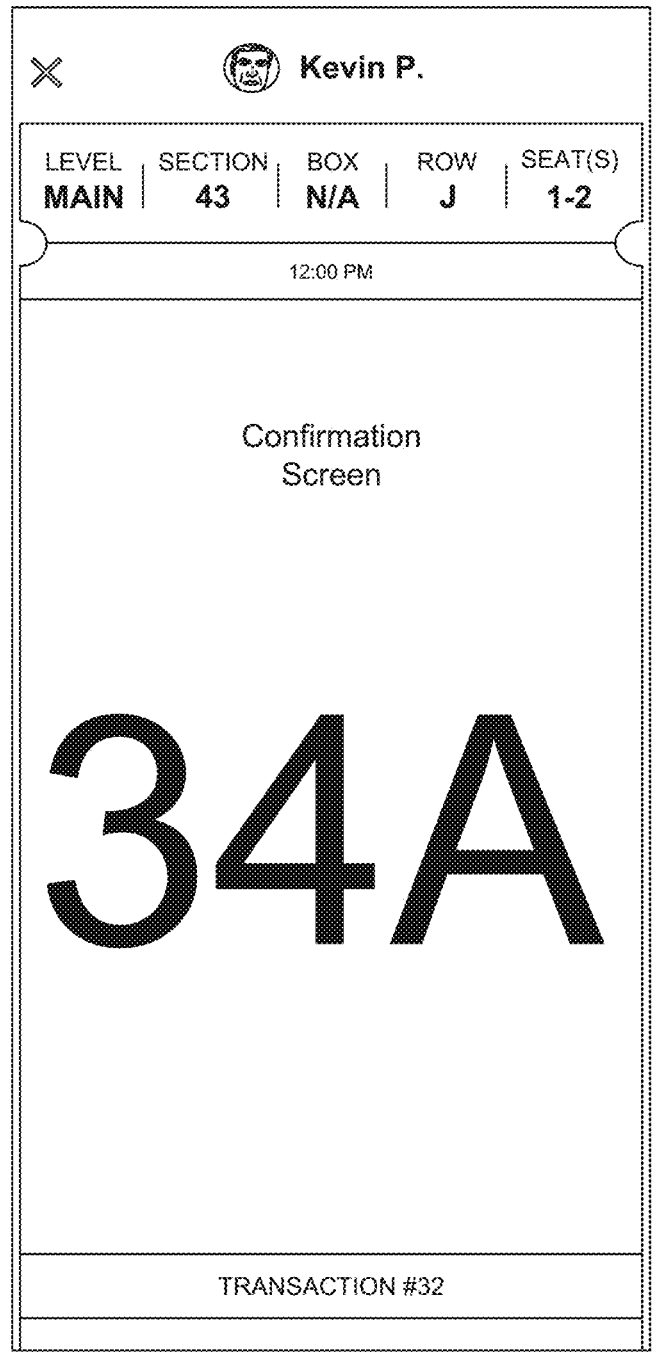
FIG. 24 is a depiction of a confirmation screen employed by exemplary embodiments of the system of FIG. 1 according to exemplary embodiments of the present technology.

Having completed the exchange, the mobile application employing exemplary embodiments of the present technology preferably launches a confirmation screen on both the Buyer and Seller mobile devices, as depicted in FIG. 24. The confirmation screen preferably includes a unique transaction ID number to assist the parties in locating one another in large and crowded venues. The number may be a transaction number, and randomly generated code provided to the mobile phones or each user, or both. Preferable embodiments may also include other means of facilitating the exchange of tickets, including geolocation information in the form of a map, geographical distance calculator, or the like. Those of ordinary skill in the art will recognize additional features available to assist the parties in locating each other using mobile device technology.

Figure 25:
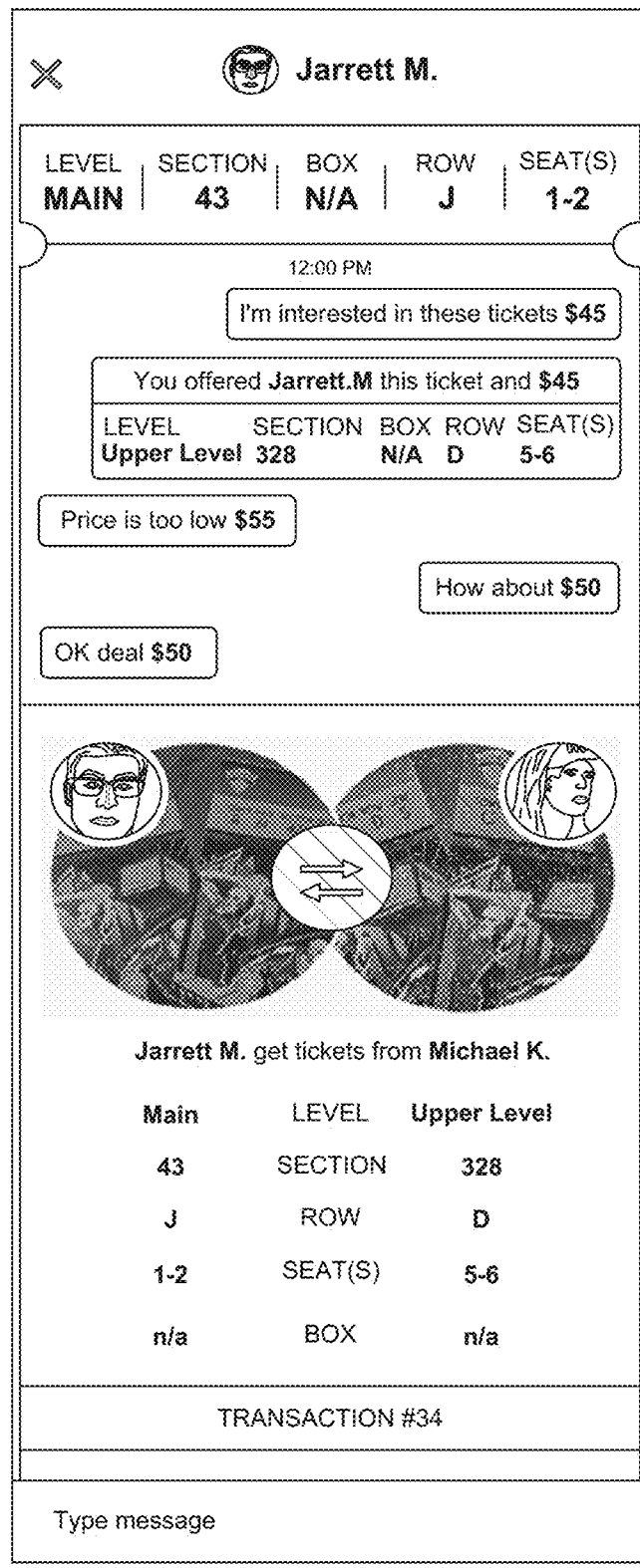
FIG. 25 is a depiction of a negotiation platform employed by exemplary embodiments of the system of FIG. 1 according to exemplary embodiments of the present technology.
Figure 26:
FIG. 26 is a depiction of a current-offers screen employed by exemplary embodiments of the system of FIG. 1 according to exemplary embodiments of the present technology.

FIG. 25 depicts a negotiation platform for a mobile application employing exemplary embodiments of the present technology. In this instance, the parties have reached an agreement on exchanging tickets, rather than just a sale from one party to the other. Preferable embodiments of the negotiation platform would include photographs and ticket information from both parties in such instances, as depicted. FIG. 26 depicts an offers page for a mobile application employing exemplary embodiments of the present technology. In this instance, the Seller has received several offers for the posted tickets. As depicted, preferable embodiments provide the Seller with information about the status of the various offers. Preferable embodiments of the mobile application will generate notifications for an activity with respect to a potential Buyer's offer. For example, a Buyer is notified if his or her offer is declined or countered. A notification is also generated if a Buyer's offer is accepted. Preferable embodiments would also generate a notification for other potential Buyers upon a Sellers acceptance of an offer to indicate that the tickets are no longer available. Preferable embodiments also update the system upon acceptance of an offer to remove the tickets from the list of available tickets. Preferably, the sold tickets are removed from the system's tickets database or flagged in some manner to indicate that they are no longer available for purchase. The mobile application employing the present technology thus facilitates ticket exchanges amongst users in an efficient and effective manner.

Additional screenshots depicting aspects of a mobile application employing exemplary embodiments of the present technology are included in Provisional Patent Application Ser. Nos. 62/366,386 and 62/501,898, which are hereby expressly incorporated herein by reference.

While the present technology has been described with reference to particular embodiments and arrangements of parts, features, and the like, the present technology is not limited to these embodiments or arrangements. Indeed, many modifications and variations will be ascertainable to those of skill in the art, all of which are inferentially included in these teachings.

What is claimed is:

1. A system for exchanging or selling event tickets, comprising:
    a database;
    a computing device, said computing device in communication with at least one seller's mobile device and at least one buyer's mobile device via a network;
    a tickets information module executing on said computing device for posting tickets for attending an event in a venue, searching available tickets for the event, and processing offers and responses; and
    a geolocation information module executing on said computing device for tracking geolocations of the at least one seller's mobile device and the at least one buyer's mobile device, wherein the geolocation information module tracks and verifies, in real-time, that the at least one seller's mobile device and at least one buyer's mobile device are located within the venue of the event at a same time before permitting a transaction for an exchange or sale of tickets for the event;
    wherein the tickets information module receives available-tickets information from the at least one seller's mobile device over the network while the at least one seller is within the venue to attend the event, and the tickets information module displays the available-tickets information on the at least one buyer's mobile device while the at least one seller is within the venue to attend the event.

2. The system of claim 1, further comprising a confirmation platform module executing on said computing device for facilitating the exchange or sale of the tickets, the confirmation platform module calculating a geographical distance between the at least one buyer and the at least one seller and generating a digital map reflecting the geolocations of the at least one buyer and the at least one seller within the venue;
    wherein at least one of the geographical distance or the digital map is displayed on the at least one seller's mobile device or the at least one buyer's mobile device; and
    wherein at least one of the geographical distance or the digital map is updated in real-time.

3. The system of claim 1,
    wherein the tickets information module receives, over the network, offer information from the at least one buyer's mobile device and receives response information from the at least one seller's mobile device;
    wherein,
    when the response information comprises a rejection of the offer information, a notification module generates and sends a rejection notification informing the at least one buyer of the seller's rejection of the offer information, and a database maintenance module updates the offer information in the database,
    when the response information comprises counteroffer information, the database maintenance module stores the counteroffer information in the database, the notifications module generates a counteroffer notification containing the counteroffer information and sends the notification to the at least one buyer's mobile device, and the tickets information module displays the counteroffer information on the at least one buyer's mobile device,
    when the response information comprises a request to negotiate, the notifications module generates and sends the at least one buyer a notification informing the buyer of the seller's request to negotiate, and a negotiation platform module launches a negotiation platform, or
    when the response information comprises an acceptance of the offer information, the notifications module generates and sends a notification indicating the at least buyer of the seller's acceptance of the offer information, the database maintenance module updates the available-tickets information in the database, and a confirmation platform module launches a confirmation platform to facilitate an exchange of tickets.

4. The system of claim 1, further comprising a negotiations platform module for facilitating negotiations between the at least one buyer and the at least one seller, wherein the negotiations platform module generates offer information and response to offer information, and wherein the negotiations platform module includes a text-based interaction platform accessible via the network on each of the seller's mobile device and the buyer's mobile device.

5. The system of claim 4, wherein when the response to offer information comprises an acceptance, the tickets information module processes payment from the at least one buyer to the at least one seller.

6. The method of claim 1, wherein the database comprises a tickets database for storing tickets information and a users database for storing user information concerning the at least one buyer and the at least one seller.

7. A method for exchanging or selling event tickets, comprising the steps of:
- authenticating one or more users, including at least one seller and at least one buyer;
- receiving geolocation information from mobile devices of the at least one seller and the at least one buyer over a network;
- receiving available-tickets information for attending an event in a venue from the at least one seller over the network while the at least one seller is within the venue to attend the event;
- verifying that the at least one seller's location is within the venue associated with the available-tickets information using the geolocation information;
- storing the available-tickets information in a database upon verifying that the at least one seller's location is within the venue associated with the available-tickets information;
- verifying the at least one buyer's location is within the venue at a same time as the at least one seller using the geolocation information;
- retrieving the available-tickets information from the database and sending the available-tickets information to the at least one buyer over the network;
- receiving offer information from the at least one buyer over the network while the at least one buyer is within the venue to attend the event;
- generating an offer notification and sending the offer notification to the at least one seller over the network; and
- receiving a response to offer from the at least one seller over the network and sending the response to offer to the at least one buyer over the network.

8. The method of claim 7, further comprising a step of processing the response to offer including:
- when the response to offer comprises rejection information, sending a rejection notification to the at least one buyer that the at least one seller rejected the offer;
- when the response to offer comprises counteroffer information, sending a counteroffer notification to the at least one buyer containing the counteroffer information;
- when the response to offer comprises request to negotiate information, launching a negotiations platform; or
- when the response to offer comprises acceptance information, sending an acceptance notification to the at least one buyer that the at least one seller accepted the offer, updating the available-tickets information in the database, and launching a confirmation platform to facilitate an exchange of tickets.

9. The method of claim 8, wherein the confirmation platform generates a unique transaction code for display on the mobile devices of the at least one seller and the at least one buyer.

10. The method of claim 8, wherein the negotiations platform comprises a text-based interaction platform.

11. The method of claim 7, further comprising the steps of:
- comparing the geolocation information from the mobile devices of the at least one buyer and the at least one seller;
- generating a geographical distance by comparing the geolocations of the mobile devices of the at least one buyer and the at least one seller; and
- displaying the geographical distance on the mobile devices of the at least one buyer and the at least one seller, and updating the geographical distance in real-time.

12. The method of claim 7, further comprising the steps of:
- comparing the geolocation information from the mobile devices of the at least one buyer and the at least one seller;
- generating a digital map reflecting the geolocations of the mobile devices of the at least one buyer and the at least one seller; and
- displaying the digital map on the mobile devices of the at least one buyer and the at least one seller, and updating the digital map in real-time.

13. The method of claim 7, wherein the available-tickets information further comprises at least one of event information, event date information, event venue information, seat information comprising seat level, seat section, seat row, seat number, and box number, and asking-price information.

14. The method of claim 7, wherein the offer information comprises at least one of offer-price information, a text-based message, and exchange-ticket information comprising one or more photographs, event information, event date information, event venue information, and seat information comprising seat level, seat section, seat row, seat number, and box number.

15. The method of claim 7, wherein the database stores available-ticket information and user information, wherein the database comprises a tickets database and a users database, the tickets database storing available-ticket information and the users database storing user information.

16. The method of claim 7, further comprising the step of:
- processing payment from the at least one buyer to the at least one seller when the response to offer comprises an acceptance.

17. A system for exchanging or selling event tickets, comprising:
- a computing device, said computing device in communication with at least one seller's mobile device and at least one buyer's mobile device via a network;
- said computing device comprising a geolocation information module for determining geolocations of the one or more mobile devices and a tickets information module for posting tickets for attending an event in a venue and searching available tickets for the event;
- wherein the tickets information module receives available-tickets information from the seller's mobile device while the at least one seller is within the venue to attend the event;
- wherein the available-tickets information is stored in a database and accessible via the network for display on the buyer's mobile device;
- wherein the geolocation information module verifies that the geolocations of the seller's mobile device and the buyer's mobile device are within the venue at a same time to attend the event as a prerequisite to facilitating an exchange or sale of the tickets.

18. The system of claim 17, wherein the confirmation platform generates a unique code accessible via the network for display on each of the seller's mobile device and the buyer's mobile device.

19. The system of claim 17, wherein the available-tickets information includes a photograph received in response to the at least one seller being prompted via the seller's mobile device to take the photograph using the seller's mobile device while the at least one seller is within the venue to attend the event.

20. The system of claim 19, wherein the geolocation information module verifies the geolocation of the seller's mobile device and receives a timestamp by extracting metadata from the photograph.

\* \* \* \* \*